United States Patent
Cross et al.

(10) Patent No.: US 10,568,383 B2
(45) Date of Patent: Feb. 25, 2020

(54) SOLE SYSTEM FOR AN ARTICLE OF FOOTWEAR INCORPORATING A KNITTED COMPONENT WITH A ONE-PIECE KNIT OUTSOLE AND A TENSILE ELEMENT

(71) Applicant: NIKE, Inc., Beaverton, OR (US)

(72) Inventors: Tory M. Cross, Portland, OR (US); Daniel A. Podhajny, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 14/598,433

(22) Filed: Jan. 16, 2015

(65) Prior Publication Data

US 2016/0206040 A1    Jul. 21, 2016

(51) Int. Cl.
  *A43B 13/02* (2006.01)
  *A43C 15/16* (2006.01)
  *A43B 23/02* (2006.01)

(52) U.S. Cl.
  CPC .......... *A43B 13/02* (2013.01); *A43B 23/0245* (2013.01); *A43C 15/16* (2013.01)

(58) Field of Classification Search
  CPC ......... A43B 13/02; A43B 23/045; A43B 1/04; A43B 13/12; A43B 23/0235; A43C 15/16; D04B 1/22
  USPC .......................................................... 36/103
  See application file for complete search history.

(56) References Cited

U.S. PATENT DOCUMENTS

| | | | |
|---|---|---|---|
| 1,791,177 A * | 2/1931 | Tassel, Jr. | A43B 13/00 36/30 A |
| 1,852,883 A | 4/1932 | Gustaveson | |
| 1,877,080 A * | 9/1932 | Isago | D04B 1/22 36/7.5 |
| 2,342,466 A * | 2/1944 | Hiram | A43B 23/22 36/76 R |
| 2,386,667 A * | 10/1945 | Doherty | A43B 13/00 36/30 R |
| 3,087,262 A | 4/1963 | Russell | |
| 3,352,032 A | 11/1967 | Yamaguchi | |
| 3,834,046 A | 9/1974 | Fowler | |

(Continued)

FOREIGN PATENT DOCUMENTS

| CN | 201878889 U | 6/2011 |
|---|---|---|
| DE | 4214831 | 11/1993 |

(Continued)

OTHER PUBLICATIONS

International Search Report and Written Opinion for International Application No. PCT/US2016/013076, dated May 18, 2016, 14 pages.

(Continued)

*Primary Examiner* — Anna K Kinsaul
*Assistant Examiner* — F Griffin Hall
(74) *Attorney, Agent, or Firm* — Brinks Gilson & Lione

(57) ABSTRACT

An article of footwear including a sole system, including an upper and the sole system. The sole system includes a knitted component incorporating a one-piece knit outsole. The knit outsole has a ground-facing side, a top side, an inlaid tensile element, and a ground-engaging cleat member protruding from the ground-facing side of the knit outsole. The tensile element may be adjacent a cleat member. The upper is connected at its bottom to the top side of the knit outsole.

19 Claims, 23 Drawing Sheets

(56) References Cited

U.S. PATENT DOCUMENTS

| | | | |
|---|---|---|---|
| 4,040,275 A | 8/1977 | Castello | |
| 4,149,274 A * | 4/1979 | Garrou | A41B 11/008 |
| | | | 2/239 |
| 4,187,620 A | 2/1980 | Seiner | |
| 4,348,003 A | 9/1982 | Beneteau | |
| 4,356,643 A | 11/1982 | Kester et al. | |
| 4,631,221 A | 12/1986 | Disselbeck et al. | |
| 4,651,354 A | 3/1987 | Petrey | |
| 5,077,916 A | 1/1992 | Beneteau | |
| 5,086,576 A | 2/1992 | Lamson | |
| 5,330,818 A | 7/1994 | Langley | |
| 5,367,791 A | 11/1994 | Gross et al. | |
| 5,452,526 A * | 9/1995 | Collins | A43B 1/0072 |
| | | | 36/108 |
| 5,537,762 A | 7/1996 | Walters | |
| 5,595,003 A | 1/1997 | Snow | |
| 5,619,809 A | 4/1997 | Sessa | |
| 5,836,094 A | 11/1998 | Figel | |
| 5,896,680 A | 4/1999 | Kim et al. | |
| 5,926,974 A | 7/1999 | Friton | |
| 6,007,898 A | 12/1999 | Kim et al. | |
| 6,029,376 A | 2/2000 | Cass | |
| 6,145,221 A | 11/2000 | Hockerson | |
| 6,412,196 B1 | 7/2002 | Gross | |
| 6,430,844 B1 | 8/2002 | Otis | |
| 6,571,491 B2 | 6/2003 | Safdeye et al. | |
| 6,598,324 B1 | 7/2003 | Tsuji | |
| 6,658,766 B2 | 12/2003 | Kraeuter et al. | |
| 6,685,011 B2 | 2/2004 | Nishiwaki et al. | |
| 6,691,432 B2 | 2/2004 | Masseron | |
| 6,698,109 B2 | 3/2004 | Otis et al. | |
| 6,701,643 B2 | 3/2004 | Geer | |
| 6,708,342 B2 | 3/2004 | Boersema | |
| 6,729,046 B2 | 5/2004 | Ellis, III | |
| 6,751,890 B1 | 6/2004 | Tsai | |
| 6,782,642 B2 | 8/2004 | Knoche et al. | |
| 6,813,847 B2 | 11/2004 | Workman | |
| 6,823,611 B2 | 11/2004 | Otis et al. | |
| 6,840,066 B2 | 1/2005 | Dickerson | |
| 6,845,572 B1 | 1/2005 | Haimerl et al. | |
| 6,931,762 B1 | 8/2005 | Dua | |
| 6,968,637 B1 * | 11/2005 | Johnson | A43B 3/0063 |
| | | | 36/108 |
| 6,986,269 B2 | 1/2006 | Dua | |
| 7,013,581 B2 | 3/2006 | Greene et al. | |
| 7,036,246 B2 | 5/2006 | Otis et al. | |
| 7,048,881 B2 | 5/2006 | Otis et al. | |
| 7,111,415 B2 | 9/2006 | Hockerson | |
| 7,146,750 B2 | 12/2006 | Issler | |
| 7,178,267 B2 | 2/2007 | Skaja et al. | |
| 7,313,876 B2 | 1/2008 | Morgan et al. | |
| 7,322,131 B2 | 1/2008 | Yamashita et al. | |
| 7,347,011 B2 | 3/2008 | Dua et al. | |
| 7,353,626 B2 | 4/2008 | Otis et al. | |
| 7,444,766 B2 | 11/2008 | Mitchell | |
| 7,467,484 B2 | 12/2008 | Chang et al. | |
| 7,487,555 B2 | 2/2009 | Takeda et al. | |
| 7,540,100 B2 | 6/2009 | Pawlus et al. | |
| 7,555,847 B2 | 7/2009 | Kendall | |
| 7,587,915 B2 | 9/2009 | Kaneda | |
| 7,591,083 B2 | 9/2009 | Geer et al. | |
| 7,703,220 B2 | 4/2010 | Aveni | |
| 7,712,229 B2 | 5/2010 | Yang | |
| 7,788,827 B2 * | 9/2010 | Fogg | A43B 3/128 |
| | | | 36/103 |
| 7,793,428 B2 | 9/2010 | Shenone | |
| 7,793,434 B2 | 9/2010 | Sokolowski et al. | |
| 7,797,856 B2 | 9/2010 | Andrews et al. | |
| 7,854,076 B2 | 12/2010 | Keppler et al. | |
| 7,882,648 B2 | 2/2011 | Langvin | |
| 8,197,736 B2 | 6/2012 | Frasson et al. | |
| 8,387,282 B2 | 3/2013 | Baker et al. | |
| 8,474,155 B2 | 7/2013 | McDonald et al. | |
| 8,490,229 B2 | 7/2013 | Mintz | |
| 8,505,216 B2 | 8/2013 | Sokolowski et al. | |
| 8,505,220 B2 | 8/2013 | James et al. | |
| 8,567,097 B2 * | 10/2013 | Edy | A43B 3/0036 |
| | | | 36/107 |
| 8,577,751 B2 | 11/2013 | Langvin | |
| 8,713,819 B2 | 5/2014 | Auger et al. | |
| 8,756,834 B1 | 6/2014 | Halberstadt et al. | |
| 8,776,397 B2 | 7/2014 | Borel et al. | |
| 8,839,532 B2 | 9/2014 | Huffa et al. | |
| 8,914,998 B2 | 12/2014 | Gheorghian | |
| 9,078,488 B1 | 7/2015 | Meir et al. | |
| 9,326,562 B2 | 5/2016 | Weidl et al. | |
| 2002/0035796 A1 * | 3/2002 | Knoche | A43B 1/0009 |
| | | | 36/59 R |
| 2002/0116843 A1 | 8/2002 | Harrison | |
| 2002/0148140 A1 | 10/2002 | Otis et al. | |
| 2002/0148141 A1 | 10/2002 | Otis et al. | |
| 2002/0152639 A1 | 10/2002 | Otis et al. | |
| 2002/0162248 A1 | 11/2002 | Otis et al. | |
| 2003/0033207 A1 | 2/2003 | Litke et al. | |
| 2004/0028929 A1 | 2/2004 | Chang | |
| 2004/0148803 A1 | 8/2004 | Grove | |
| 2005/0071242 A1 | 3/2005 | Allen et al. | |
| 2005/0120593 A1 * | 6/2005 | Mason | A43B 5/02 |
| | | | 36/107 |
| 2005/0198868 A1 | 9/2005 | Scholz | |
| 2005/0241182 A1 | 11/2005 | Otis et al. | |
| 2006/0059716 A1 | 3/2006 | Yamashita et al. | |
| 2006/0143946 A1 | 7/2006 | Otis et al. | |
| 2008/0110048 A1 | 5/2008 | Dua et al. | |
| 2008/0263900 A1 | 10/2008 | Determe | |
| 2009/0090024 A1 | 4/2009 | Phlawadana | |
| 2009/0181590 A1 | 7/2009 | Hansen et al. | |
| 2009/0183389 A1 | 7/2009 | Miller et al. | |
| 2010/0112275 A1 | 5/2010 | Hansen et al. | |
| 2010/0146823 A1 | 6/2010 | Yabushita | |
| 2010/0154256 A1 | 6/2010 | Dua | |
| 2010/0186265 A1 | 7/2010 | Evans | |
| 2010/0235258 A1 | 9/2010 | Langvin | |
| 2011/0047816 A1 | 3/2011 | Nurse | |
| 2011/0047833 A1 | 3/2011 | Tai | |
| 2011/0167677 A1 | 7/2011 | Peikert et al. | |
| 2011/0302807 A1 | 12/2011 | McDuff | |
| 2012/0180343 A1 | 7/2012 | Auger et al. | |
| 2012/0233882 A1 | 9/2012 | Huffa et al. | |
| 2012/0234052 A1 | 9/2012 | Huffa et al. | |
| 2012/0317841 A1 | 12/2012 | Taylor et al. | |
| 2013/0019499 A1 | 1/2013 | Hsu | |
| 2013/0091741 A1 | 4/2013 | Frank | |
| 2013/0174445 A1 | 7/2013 | Hakkala et al. | |
| 2013/0232823 A1 | 9/2013 | Kasprzak | |
| 2013/0269212 A1 | 10/2013 | Little | |
| 2013/0276333 A1 | 10/2013 | Wawrousek et al. | |
| 2013/0318831 A1 | 12/2013 | Foxen | |
| 2013/0326911 A1 * | 12/2013 | Baucom | A43B 13/122 |
| | | | 36/103 |
| 2013/0340289 A1 | 12/2013 | Thevenoud | |
| 2013/0340290 A1 | 12/2013 | Hartmann | |
| 2013/0340295 A1 * | 12/2013 | Adami | A43B 5/02 |
| | | | 36/25 R |
| 2014/0020192 A1 | 1/2014 | Jones et al. | |
| 2014/0068968 A1 | 3/2014 | Podhajny et al. | |
| 2014/0082964 A1 | 3/2014 | Lin | |
| 2014/0123520 A1 | 5/2014 | Tayar | |
| 2014/0150297 A1 | 6/2014 | Holmes et al. | |
| 2014/0202039 A1 | 7/2014 | Geer et al. | |
| 2014/0245632 A1 | 9/2014 | Podhajny | |
| 2014/0245633 A1 | 9/2014 | Podhajny | |
| 2014/0290099 A1 | 10/2014 | Corbett | |
| 2014/0310984 A1 * | 10/2014 | Tamm | D04B 1/102 |
| | | | 36/84 |
| 2014/0310985 A1 * | 10/2014 | Tran | A43B 1/00 |
| | | | 36/84 |
| 2014/0310986 A1 * | 10/2014 | Tamm | A43B 1/00 |
| | | | 36/84 |
| 2014/0345164 A1 | 11/2014 | Campbell et al. | |
| 2014/0352179 A1 | 12/2014 | Bell | |
| 2014/0366402 A1 | 12/2014 | Cavaliere | |
| 2014/0373392 A1 | 12/2014 | Cullen | |

(56) References Cited

U.S. PATENT DOCUMENTS

| | | |
|---|---|---|
| 2015/0013187 A1 | 1/2015 | Taniguchi et al. |
| 2015/0040436 A1 | 2/2015 | Clerc et al. |
| 2015/0040438 A1 | 2/2015 | Baucom |
| 2015/0052778 A1 | 2/2015 | Kirk |
| 2015/0068064 A1 | 3/2015 | Morag et al. |
| 2015/0113831 A1 | 4/2015 | Weingart et al. |
| 2015/0128449 A1 | 5/2015 | Lin |
| 2015/0201707 A1 | 7/2015 | Bruce |
| 2015/0223552 A1* | 8/2015 | Love ............... A43C 15/02 36/134 |
| 2015/0245684 A2 | 9/2015 | Heard et al. |
| 2015/0250256 A1 | 9/2015 | Podhajny |
| 2015/0257484 A1 | 9/2015 | Campbell et al. |
| 2015/0273778 A1 | 10/2015 | Campos, II |
| 2015/0320139 A1 | 11/2015 | Peitzker |
| 2015/0351493 A1 | 12/2015 | Ashcroft |
| 2016/0000173 A1 | 1/2016 | Spielmann et al. |
| 2016/0031164 A1 | 2/2016 | Downs |
| 2016/0066651 A1 | 3/2016 | Terai |
| 2016/0073727 A1 | 3/2016 | Bier et al. |
| 2016/0073728 A1 | 3/2016 | Peikert et al. |
| 2016/0081419 A1 | 3/2016 | Theoklitos |
| 2016/0095377 A1 | 4/2016 | Tamm |
| 2016/0114546 A1 | 4/2016 | Yang |

FOREIGN PATENT DOCUMENTS

| | | |
|---|---|---|
| EP | 2 792 265 A2 | 10/2014 |
| GB | 2063054 | 6/1981 |
| GB | 2092881 | 8/1982 |
| JP | H06284905 | 10/1994 |
| JP | 2013231261 | 11/2013 |
| JP | 2014-210177 A | 11/2014 |
| TW | M447111 | 2/2013 |
| WO | 9943229 | 9/1999 |
| WO | WO 2009/0149886 A1 | 12/2009 |
| WO | WO 2014/152333 A1 | 9/2014 |

OTHER PUBLICATIONS

International Search Report and Written Opinion for International Application No. PCT/US2016/013078, dated Mar. 24, 2016.

Office Action in U.S. Appl. No. 14/598,389, dated Jul. 11, 2016, 17 pages.

Office Action in U.S. Appl. No. 14/598,406, dated Jul. 12, 2016, 14 pages.

Office Action in corresponding U.S. Appl. No. 14/598,389, dated Mar. 1, 2017, 14 pages.

Office Action in corresponding U.S. Appl. No. 14/598,447, dated Mar. 28, 2017, 6 pages.

Office Action in corresponding U.S. Appl. No. 14/598,406, dated Feb. 22, 2017, 14 pages.

Final Rejection for Korean Patent Application 10-2017-7022855 dated Jun. 4, 2019, 7 pgs. including English translation.

Office Action dated Nov. 19, 2018 for Korean Application No. 10-2017-7022855 (with English translation) (12 pg.).

Office Action in Taiwan Application No. 105101285, dated Jul. 18, 2019, 6 pages.

* cited by examiner

SOLE SYSTEM FOR AN ARTICLE OF FOOTWEAR INCORPORATING A KNITTED COMPONENT WITH A ONE-PIECE KNIT OUTSOLE AND A TENSILE ELEMENT

BACKGROUND

The present disclosure relates generally to a sole system for an article of footwear incorporating a knitted component with a one-piece knit outsole and a tensile element. The present disclosure also relates to an article of footwear comprising the knitted component. The present disclosure further is related generally to a method of knitting the knitted component, and to a method of making an article of footwear comprising the knitted component.

Conventional articles of footwear generally include two primary elements, an upper and a sole structure. The upper is secured to the sole structure and forms a void on the interior of the footwear for comfortably and securely receiving a foot. The sole structure is secured to a lower area of the upper, thereby being positioned between the upper and the ground. In athletic footwear, for example, the sole structure may include a midsole and an outsole. The midsole often includes a polymer foam material that attenuates ground reaction forces to lessen stresses upon the foot and leg during walking, running, and other ambulatory activities. Additionally, the midsole may include fluid-filled chambers, plates, moderators, or other elements that further attenuate forces, enhance stability, or influence the motions of the foot. The outsole is secured to a lower surface of the midsole and provides a ground-engaging portion of the sole system formed from a durable and wear-resistant material, such as rubber. The sole system may also include a sockliner positioned within the void and proximal a lower surface of the foot to enhance footwear comfort.

The upper generally extends over the instep and toe areas of the foot, along the medial and lateral sides of the foot, under the foot, and around the heel area of the foot. In some articles of footwear, such as basketball footwear and boots, the upper may extend upward and around the ankle to provide support or protection for the ankle. Access to the void on the interior of the upper is generally provided by an ankle opening in a heel region of the footwear. A lacing system is often incorporated into the upper to adjust the fit of the upper, thereby permitting entry and removal of the foot from the void within the upper. The lacing system also permits the wearer to modify certain dimensions of the upper, particularly girth, to accommodate feet with varying dimensions. In addition, the upper may include a tongue that extends under the lacing system to enhance adjustability of the footwear, and the upper may incorporate a heel counter to limit movement of the heel.

Articles of footwear often are constructed of many components. For example, an article of footwear may include many components, such as an upper, a sockliner, a strobel, a midsole, and an outsole. An outsole may have spikes, cleats, or other protrusions to provide additional traction under selected circumstances. Each of these components is attached to at least one, typically two, and maybe three or more of the other components. Some components thus are stitched to, adhered to, or otherwise attached to other components.

Construction of an article of footwear comprising many components may require that components having significantly different properties and characteristics must be attached to each other. For example, an upper may be formed from cloth, a midsole from soft foam, and an outsole from wear-resistant rubber. These components often can be adhered with adhesives. Adhesive may fail, causing delamination of the components. Further, wear may occur at joints between harder and softer materials, or between dissimilar materials. Therefore, such joints may cause premature failure of the article of footwear. Such joints also may provide uncomfortable sudden transitions between areas of softer or more compliant materials and areas of harder or more rigid materials.

Further, assembly of multiple components may be time-consuming and may lead to errors. For example, components from one style of an article of footwear may incorrectly be used on a different style of footwear. The number of potential errors and premature failures may be significant.

A variety of material elements (e.g., textiles, polymer foam, polymer sheets, leather, synthetic leather) are conventionally utilized in manufacturing an article of footwear. In athletic footwear, for example, the upper may have multiple layers that each include a variety of joined material elements. As examples, the material elements may be selected to impart stretch-resistance, wear-resistance, flexibility, air-permeability, compressibility, comfort, and moisture-wicking to different areas of the upper. Similarly, the sole structure may utilize a number of components to provide selected properties and characteristics. To impart the different properties to different areas of the article of footwear, material elements are often cut to desired shapes and then joined together, usually with stitching or adhesive bonding. Moreover, the material elements often are joined in a layered configuration to impart multiple properties to the same areas. As the number and type of material elements incorporated into the article of footwear increases, the time and expense associated with transporting, stocking, cutting, and joining the material elements also may increase. Waste material from cutting and stitching processes also accumulates to a greater degree as the number and type of material elements incorporated into the article of footwear increases. Moreover, articles of footwear with a greater number of material elements may be more difficult to recycle than articles of footwear formed from fewer types and numbers of material elements. By decreasing the number of material elements utilized in the article of footwear, therefore, waste may be decreased while increasing the manufacturing efficiency and recyclability of the upper.

Reducing the number of material elements may require that one material element provide multiple and additional properties and characteristics sought by users. Thus, there exists a need in the art for articles of footwear comprising a minimum number of material elements while providing a number of properties and characteristics sought by users.

SUMMARY

Various configurations of an article of footwear may have an upper and a sole system associated with the upper. Both the upper and the sole system may incorporate a knitted component.

In one aspect, the disclosure provides a sole system for an article of footwear. The sole system includes a knitted component incorporating a one-piece knit outsole and a tensile element. The knit outsole has a ground-facing side and a top side. A protruding ground-engaging cleat member is formed on the ground-facing side of the knit outsole. The tensile element may be manipulated from the ground-facing side.

In another aspect, the disclosure provides an article of footwear including the sole system. The article of footwear includes an upper and the sole system connected thereto. The upper may be one-piece or may have a strobel sock or other closure at the bottom of the upper. The top side of the outsole and the bottom of the upper are affixed.

The disclosure also provides an aspect including a method of making a sole system for an article of footwear. In accordance with the method, a ground-engaging member is formed in a one-piece knit outsole having a ground-facing side, a top side, and a tensile element. A protruding ground-engaging cleat member is formed by molding the knitted component.

In another aspect, the disclosure provides a method of making a sole system for an article of footwear. In accordance with the method, a one-piece knitted component is knitted to include a knit outsole having a tensile element. A ground-engaging cleat member is formed in the ground-facing side of the knit outsole by knitting.

In still another aspect, the disclosure provides a foot-enclosing sole system for an article of footwear. The sole system includes a one-piece foot-enclosing knit portion that encloses the foot and includes a knit outsole. The knit outsole has a ground-facing side, a top side, and a tensile element. A ground-engaging cleat member protrudes from the ground-facing side of the outsole.

Other systems, methods, features, and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
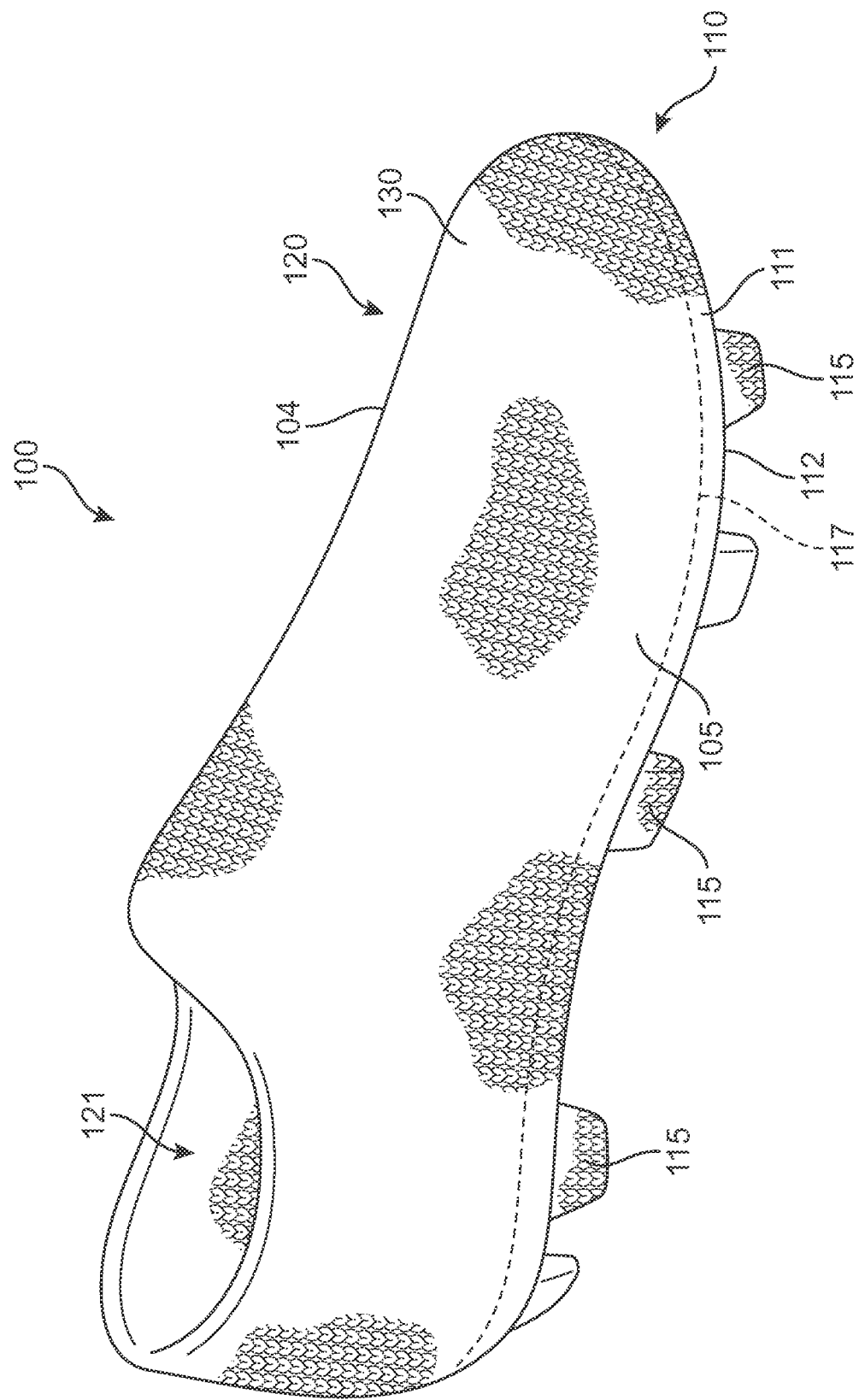
FIG. 1 is a perspective view of an exemplary embodiment of an article of footwear.
Figure 2:
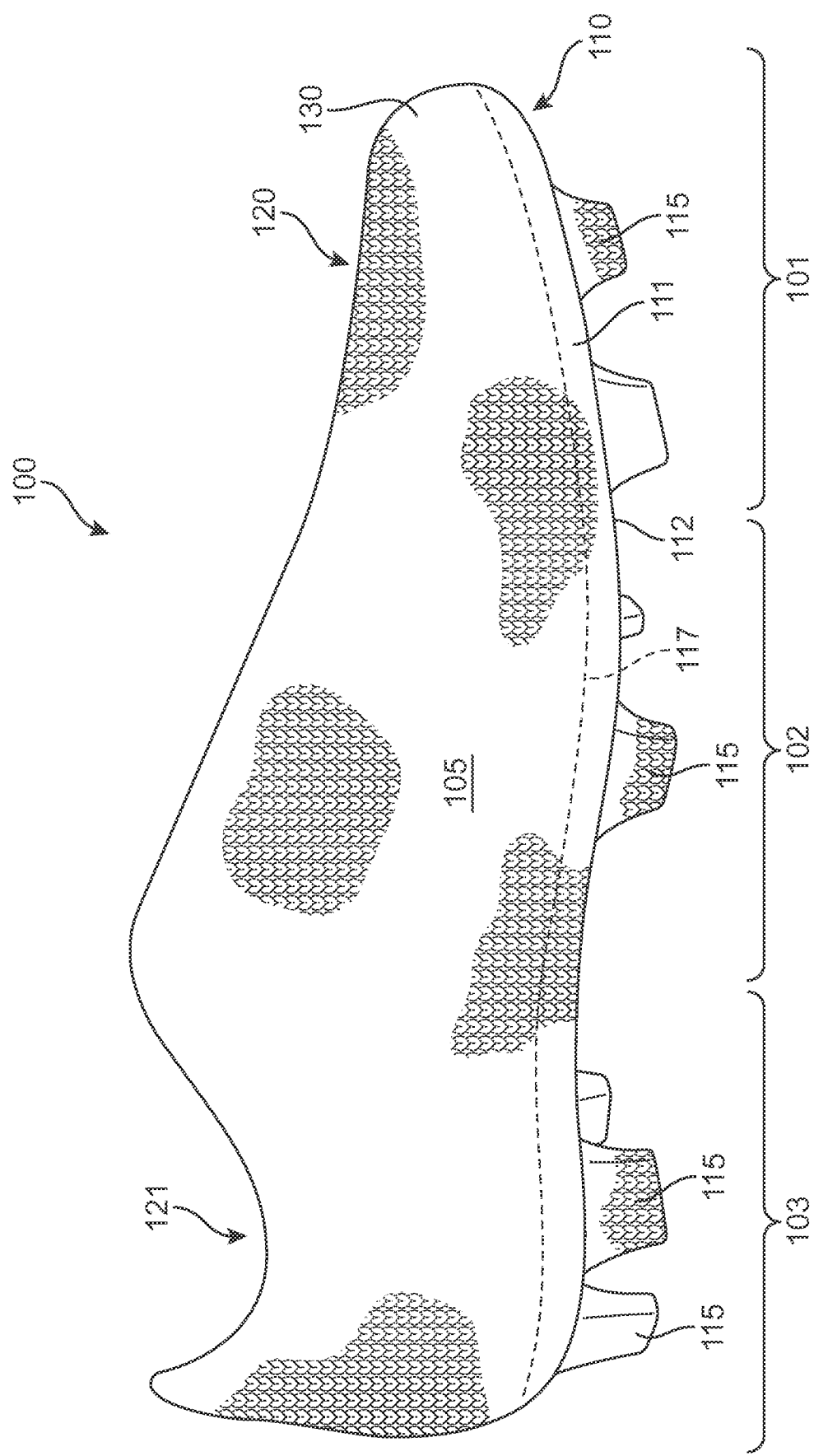
FIG. 2 is a lateral side elevational view of the exemplary embodiment of an article of footwear.
Figure 3:
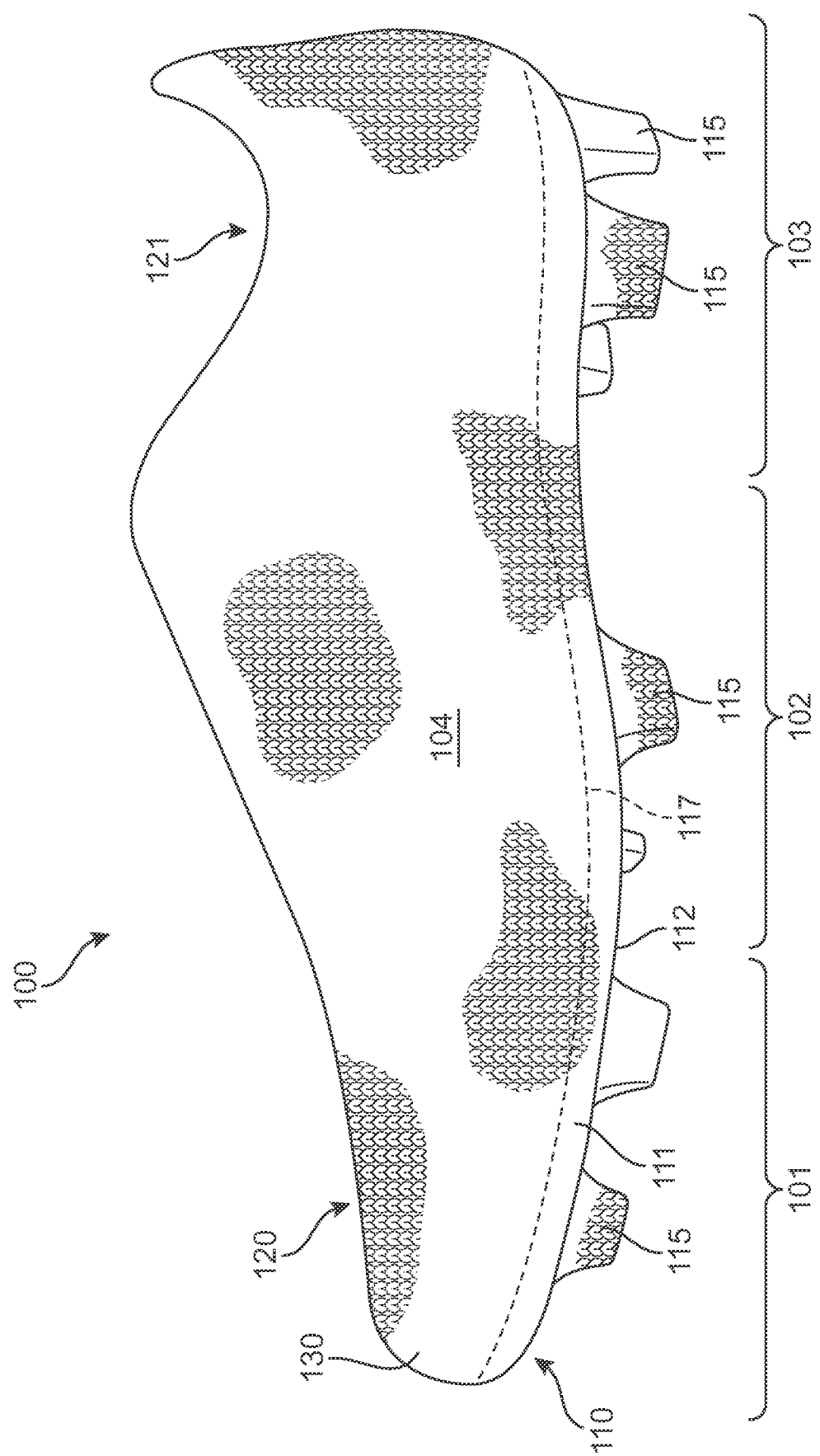
FIG. 3 is a medial side elevational view of the exemplary embodiment of an article of footwear.

An article of footwear 100 is depicted in FIGS. 1-4 as including a sole system 110 and an upper 120. Although footwear 100 is illustrated as having a general configuration suitable for enhanced traction, concepts associated with footwear 100 may also be applied to a variety of other enhanced traction-type athletic footwear types, including baseball shoes, cycling shoes, football shoes, soccer shoes, and hiking boots, for example. The concepts may also be applied to footwear types that are generally considered to be non-athletic, including work boots. Accordingly, the concepts disclosed with respect to footwear 100 apply to a wide variety of footwear types.

The following discussion and accompanying Figures disclose a variety of concepts relating to knitted components and the manufacture of knitted components. Although the knitted components may be utilized in a variety of products, an article of footwear that incorporates one of the knitted components is disclosed below as an example. The description will be directed in detail to an article of footwear. However, in addition to footwear, the knitted components may be utilized in other types of apparel (e.g., gloves or mittens) where the ability to securely grip an object may be enhanced by protuberances. Accordingly, the knitted components and other concepts disclosed herein may be incorporated into a variety of products for both personal and industrial purposes.

For reference purposes, footwear 100 may be divided into three general regions: a forefoot region 101, a midfoot region 102, and a heel region 103. Forefoot region 101 generally includes portions of footwear 100 corresponding with the toes and the joints connecting the metatarsals with the phalanges. Midfoot region 102 generally includes portions of footwear 100 corresponding with an arch area of the foot. Heel region 103 generally corresponds with rear portions of the foot, including the calcaneus bone. Footwear 100 also includes a lateral side 104 and a medial side 105, which extend through each of forefoot region 101, midfoot region 102, and heel region 103 and correspond with opposite sides of footwear 100. More particularly, lateral side 104 corresponds with an outside area of the foot (i.e., the surface that faces away from the other foot), and medial side 105 corresponds with an inside area of the foot (i.e., the surface that faces toward the other foot). Forefoot region 101, midfoot region 102, heel region 103, lateral side 104, and medial side 105 are not intended to demarcate precise areas of footwear 100. Rather, forefoot region 101, midfoot region 102, heel region 103, lateral side 104, and medial side 105 are intended to represent general areas of footwear 100 to aid in the following discussion. In addition to footwear 100, forefoot region 101, midfoot region 102, heel region 103, lateral side 104, and medial side 105 may also be applied to sole system 110, upper 120, and individual elements thereof.

Embodiments of the disclosure provide a sole system for an article of footwear. The sole system includes a knitted component incorporating a one-piece knit outsole having a tensile element. The knit outsole has a ground-facing side, a top side, and a tensile element. A protruding ground-engaging cleat member is formed on the ground-facing side of the knit outsole. The ground-engaging cleat member has a surface comprising a knitted textile that engages the ground.

Figure 4:
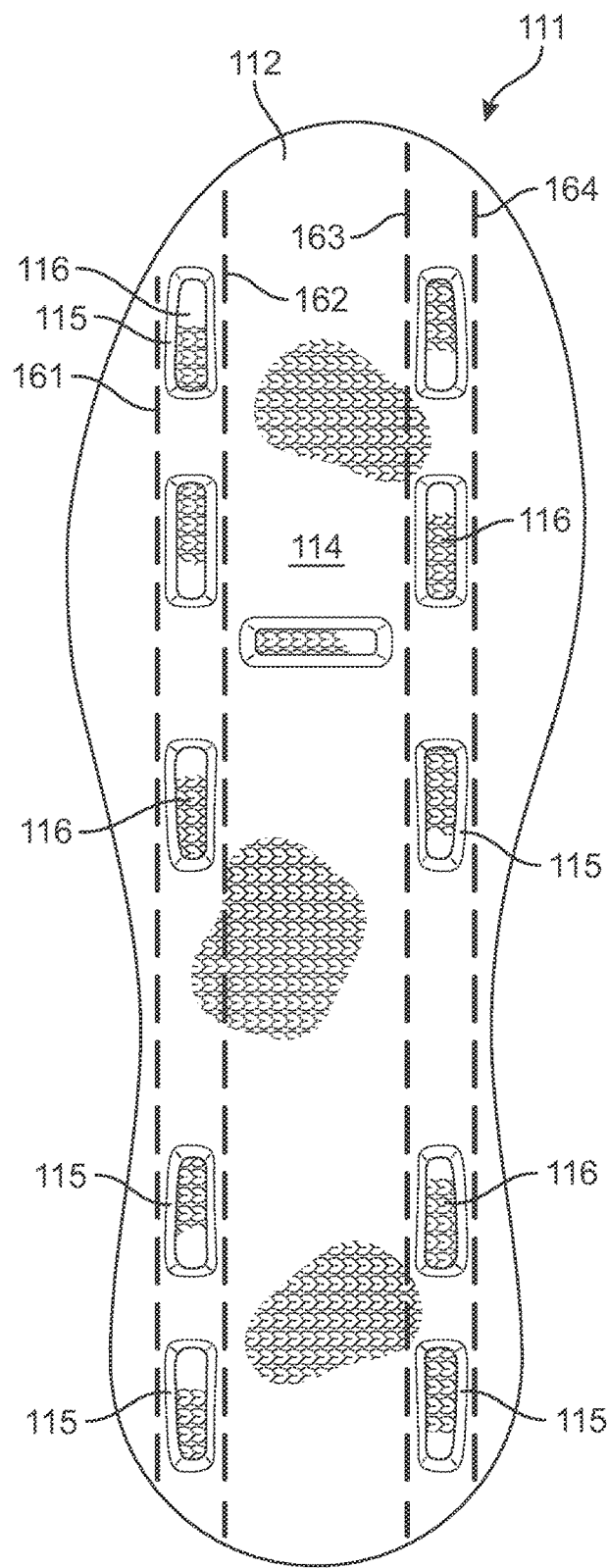
FIG. 4 is a bottom view of an exemplary embodiment of an article of footwear.

Sole system 110 is secured to upper 120 and extends between the foot and the ground when footwear 100 is worn. The primary elements of sole system 110 are a knitted component 111, a one-piece knit outsole 112, an outsole top surface or side 113 (see FIG. 16), an outsole bottom surface or side 114, and a ground-engaging cleat member 115. Knitted component 111 forming one-piece knit outsole 112 is secured to a lower surface of upper 120 and may be formed from a one-piece knitted component. One-piece knit outsole 112 is secured to upper 120 and may be formed from knitted component 111. Outsole top surface or side 113 is located on the top surface of one-piece knit outsole 112, and is positioned to extend under a lower surface of the foot. Outsole bottom surface or side 114 comprises the outer bottom ground-facing surface of sole system 110 and the bottom surface of article of footwear 100. This side of the sole faces away from the foot, and may be ground-engaging if, for example, ground-engaging cleat member 115 becomes embedded in the ground. Ground-engaging cleat members 115 protrude from outsole bottom surface 114. Bottom 116 of ground-engaging cleat member 115 engages the ground first. Although this configuration for sole system 110 provides an example of a sole system that may be used in connection with upper 120, a variety of other conventional or nonconventional configurations for sole system 110 may also be utilized. Accordingly, the features of sole system 110 or any sole system utilized with upper 120 may vary considerably. For example, in exemplary embodiments, an article of footwear may include between 5 and 15 cleat members 115 (such as 11 cleat members 115 as depicted in FIG. 4).

Additional embodiments provide a foot-enclosing sole system for an article of footwear. The sole system includes a one-piece foot-enclosing knit portion that encloses the foot and includes a knit outsole having a tensile element. The sole system thus includes both an outsole and an upper. The outsole and the upper may be knit together as a one piece element. The knit outsole has a ground-facing side, a top side, and a tensile element. A ground-engaging cleat member protrudes from the ground-facing side of the outsole. A tensile element is inlaid within the knitted component on the ground-facing side of the outsole. The ground-engaging cleat member may include a knit surface that contacts the ground.

Upper 120 defines a void within footwear 100 for receiving and securing a foot relative to sole system 110. The void is shaped to accommodate the foot and extends along a lateral side of the foot, along a medial side of the foot, over the foot, around the heel, and under the foot. Access to the void is provided by an ankle opening 121 located in at least heel region 103. In further configurations, upper 120 may include additional elements, such as (a) a heel counter in heel region 103 that enhances stability, (b) a toe guard in forefoot region 101 that is formed of a wear-resistant material, (c) a collar extending around ankle opening 121, and (d) logos, trademarks, and placards with care instructions and material information.

Many conventional footwear uppers are formed from multiple material elements (e.g., textiles, polymer foam, polymer sheets, leather, and synthetic leather) that are joined through stitching or bonding, for example. In contrast, in embodiments of the disclosure, a majority of upper 120 may be formed from a knitted component 130, which extends through each of forefoot region 101, midfoot region 102, and heel region 103 along both lateral side 104 and medial side 105, over forefoot region 101, and around heel region 103. In addition, knitted component 130 forms portions of both an exterior surface and an opposite interior surface of upper 120. As such, knitted component 130 defines at least a portion of the void within upper 120. In some configurations, knitted component 130 may also extend under the foot.

Thus, in one aspect, the disclosure provides a method of making a sole system for an article of footwear. In accordance with the method, a one-piece knitted component is knitted to include a knit outsole. A ground-engaging cleat member is formed in the ground-facing side of the knit outsole by knitting. A protruding ground-engaging cleat member may be formed by molding the knitted component. The cleat member may have a ground-engaging surface comprising a knitted surface that engages the ground and may provide traction. At least one tensile element may be adjacent the cleat member.

Embodiments including a foot-enclosing sole system provide an article of footwear that may be formed from a one-piece knitted component. Thus, the upper and the outsole may comprise a knitted textile formed together as a one-piece element. Forming an article of footwear as a one piece textile element through knitting provides significant advantages over typical articles of footwear. For example, there is no need to attach an outsole to an upper, thus significantly reducing the number of steps required for assembly and, therefore, the possibility of assembly errors. Also, there are no joints at which disparate properties and characteristics of the joined materials may cause excessive wear and premature failure.

In some embodiments, knitted component 130 and sole system 110 comprise a single knitted component. FIG. 1 through FIG. 4 illustrate such an embodiment, wherein knitted component 130 and sole system 110 comprise a single knitted component including a tensile element. In these embodiments, knitted component 130 and knitted component 111 of sole system 110 are formed of unitary knit construction so as to be a one-piece element. Joint 117 depicts a joint between upper 120 and sole system 110. However, for embodiments including sole system 110 having a one-piece foot-enclosing knit portion that encloses the foot and includes a knit outsole, joint 117 is not present. Rather, joint 117 is illustrated as a line of demarcation between sole system 110 and upper 120. No indicia corresponding to joint 117 may actually be physically present or visible on article 100.

In various embodiments, knitted component 130 may incorporate various types of yarn that impart different properties to separate areas of upper 120. For example, one area or portion of knitted component 130 may be formed from a first type of yarn that imparts a first set of properties, and another area or portion of first knitted component 130 may be formed from a second type of yarn that imparts a second set of properties. In this configuration, properties may vary throughout upper 120 by selecting specific yarns for different areas of knitted component 130. Similarly, knitted component 111 of sole system 110 may be knitted from various yarns, including any of the yarns used to form knitted component 130.

Yarns used in embodiments of the disclosure may be selected from monofilament yarns and multifilament yarns formed from natural or synthetic materials. Multifilament yarns may be twisted or untwisted. In some embodiments, yarn may be elastic or essentially inelastic. In some embodiments, yarn may be textured or have a natural finish. Natural materials may be selected from staple materials, such as silk, cotton, and wool. Synthetic materials may be selected from polymers that can be formed into filaments. Synthetic materials include but are not limited to polyesters; polyamides, such as any of the various types of homopolymeric and co-polymeric nylon; aramides, such as KEVLAR® and NOMEX®; and urethanes, such as thermoplastic polyurethane. Fusible yarns also may be suitable for some embodiments.

In embodiments of the disclosure, the yarn used to form the article of footwear may incorporate yarns with different deniers, materials (e.g., cotton, elastane, polyester, rayon, wool, and nylon), and degrees of twist, for example. The different types of yarns may affect the physical properties of a knitted component, including aesthetics, stretch, thickness, air permeability, and abrasion-resistance. In some configurations, multiple yarns with different colors may be utilized to form the knitted component. When yarns with different colors are twisted together and then knitted, the knitted component may have a heathered appearance with multiple colors randomly distributed throughout.

In some embodiments, any number of tensile elements or tensile strands may be inlaid or placed along any suitable area of outsole bottom surface 114. Moreover, tensile elements suitable for use with outsole bottom surface 114 may include the tensile strands or tensile elements and the method of manufacturing a knitted component incorporating tensile elements disclosed in one or more of the commonly-owned U.S. application Ser. No. 13/048,540 to Huffa et al., entitled "Method Of Manufacturing A Knitted Component", filed on Mar. 15, 2011 and published as United States Patent Application Publication No. 2012/0234052 on Sep. 20, 2012; U.S. Pat. No. 8,490,229 to Dua et al., entitled "Article of Footwear Having An Upper Incorporating a Knitted Component", issued Jul. 23, 2013; and U.S. Pat. No. 8,839,532, entitled "Article Of Footwear Incorporating A Knitted Component", issued Sep. 23, 2014; the entireties of which are hereby incorporated by reference herein.

Other embodiments provide an article of footwear including the sole system. The article of footwear includes an upper and the sole system connected thereto. The upper may be one-piece or may have a strobel sock or other closure at the bottom of the upper. The top side of the outsole and the bottom of the upper are affixed. The surface of the ground-engaging cleat member on the sole system comprises a knitted textile, and the textile engages the ground. A tensile element also may be present.

Figure 5:
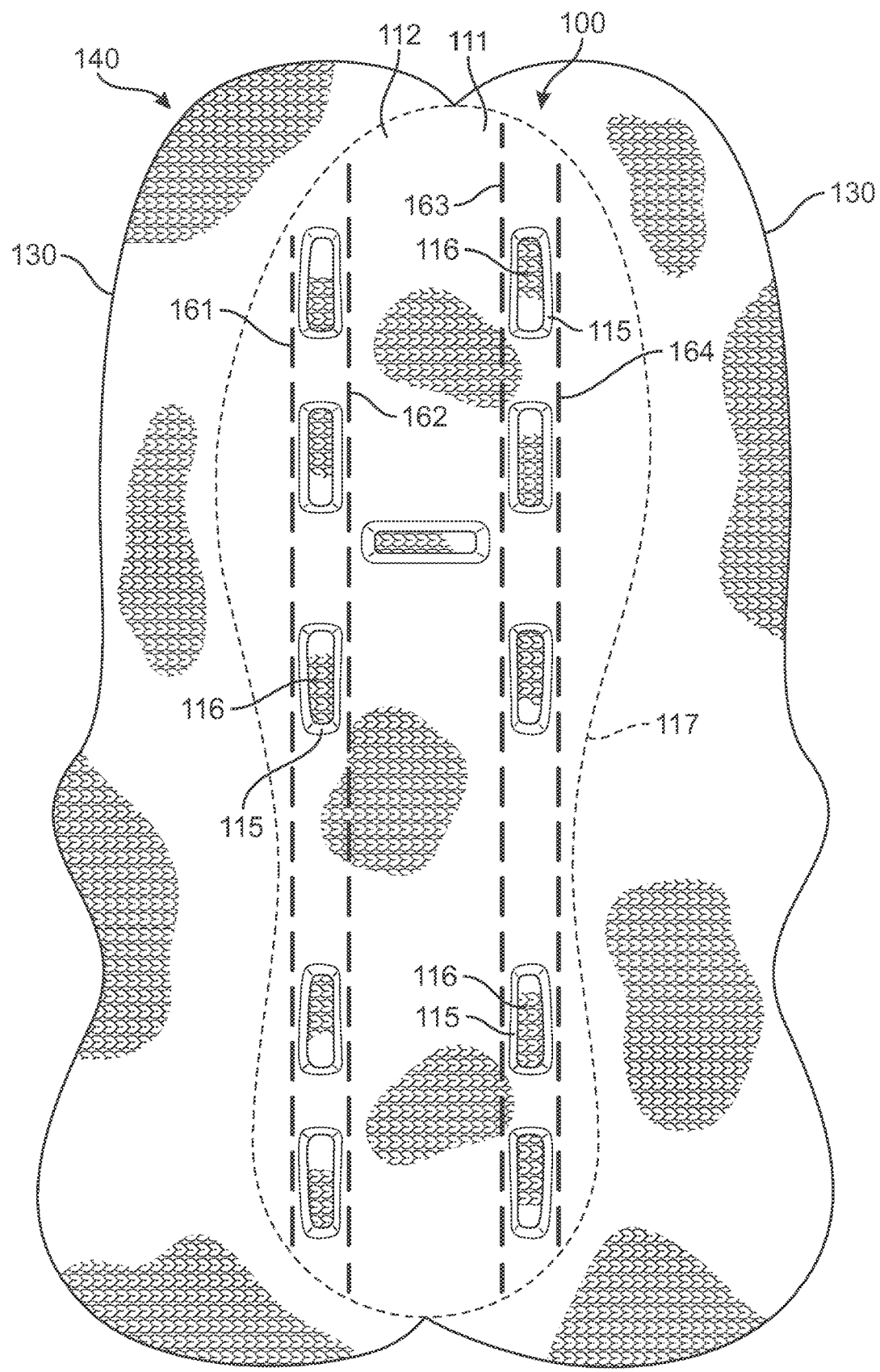
FIG. 5 is a bottom view of an exemplary embodiment of an article of footwear before a foot-enclosing portion is formed.

In some embodiments, sole system 110 and knitted component 130 may be formed of unitary knit construction such that they may be knitted as a one-piece element to form a foot-enclosing knit portion 140. FIG. 5 illustrates such an embodiment. FIG. 5 illustrates an essentially planar or flat foot-enclosing knit portion 140 comprising sole system 110 and knitted component 130. Knitted component 130 is illustrated in two elements on opposite sides of sole system 110. Sole system 110 includes knitted component 111 forming one-piece knit outsole 112 having bottom surface 114, and ground-engaging cleat member 115 having bottom 116. First tensile element 161, second tensile element 162, third tensile element 163, and fourth tensile element 164 may be inlaid within knitted component 111. In some embodiments, one or more of tensile element 161, tensile element 162, tensile element 163, or tensile element 164 may be exposed on bottom surface 114. Line of demarcation 117 is illustrated for purposes of reference.

Figure 6:
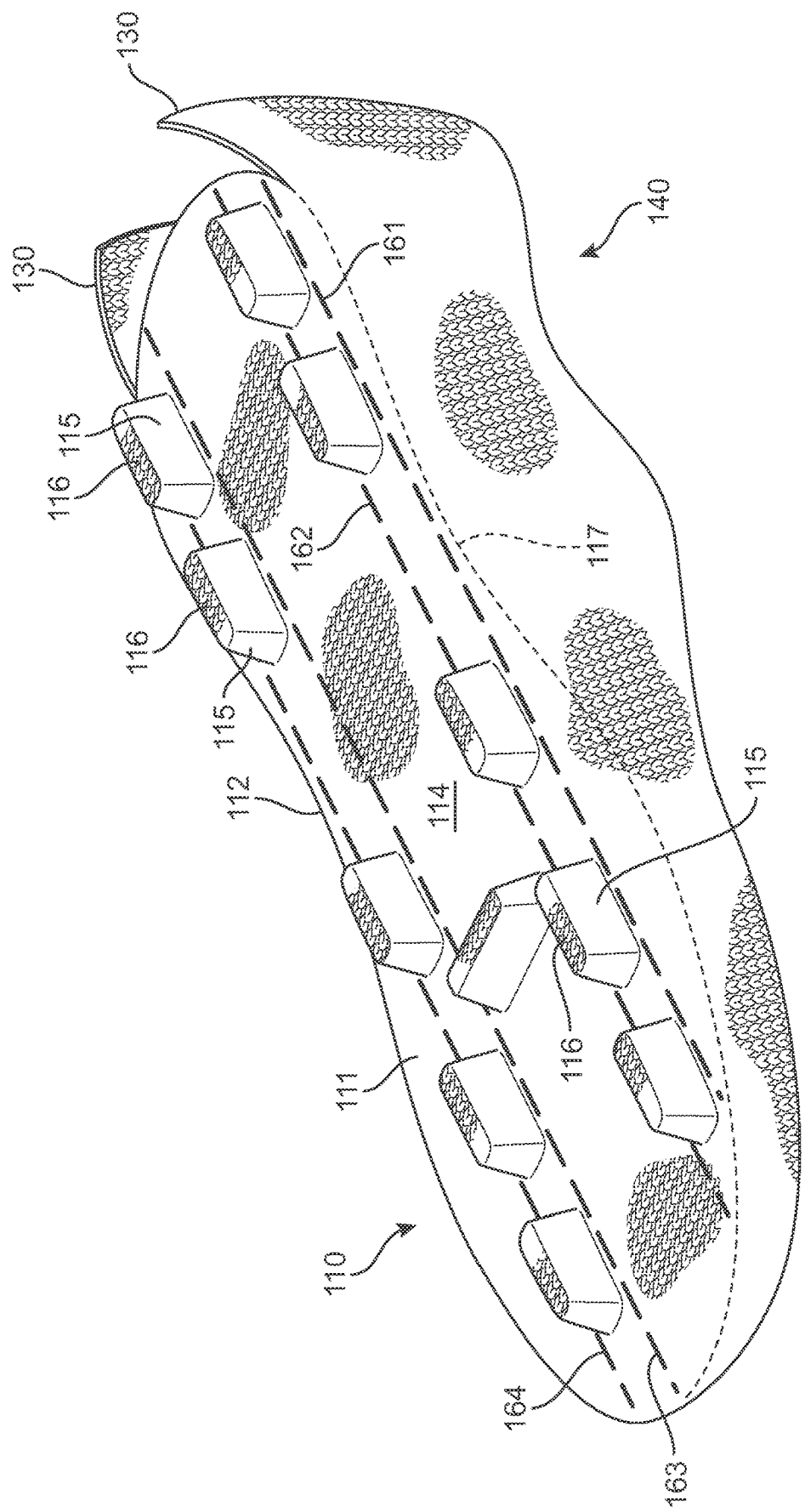
FIG. 6 is a perspective view of the bottom of an exemplary embodiment of the article of footwear of FIG. 5 as the foot-enclosing portion is formed.
Figure 7:
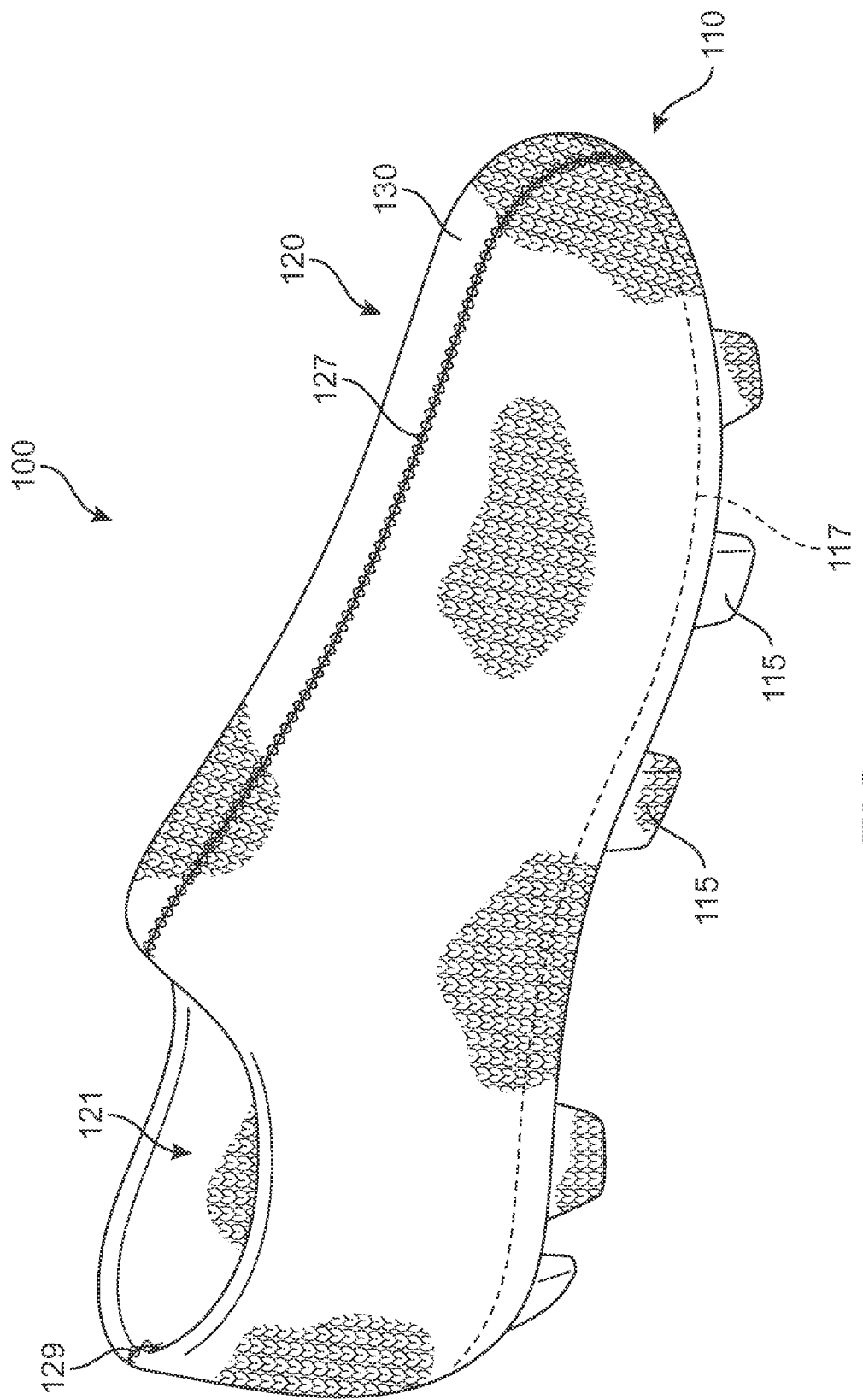
FIG. 7 is a perspective view of an exemplary embodiment of the completed article of footwear of FIG. 5 and FIG. 6.

FIG. 5, FIG. 6, and FIG. 7 illustrate an exemplary process of forming article of footwear 100 from foot-enclosing knit portion 140, which is flat or planar in FIG. 5, and is configured into a completed article of footwear 100 in FIG. 7. FIG. 6 illustrates an intermediate stage, wherein foot-enclosing knit portion 140 has been folded or bent upward from about line of demarcation 117, clearly distinguishing sole system 110 from knitted component 130. Knitted component 111, one-piece knit outsole 112 having bottom surface 114, ground-engaging cleat member 115 having bottom 116, and first tensile element 161, second tensile element 162, third tensile element 163, and fourth tensile element 164, are clearly visible as part of sole system 110. In FIG. 6, the forefoot area is completely formed, but the heel edges of knitted component 130 have not been brought together.

FIG. 7 illustrates a complete article of footwear 100 from foot-enclosing knit portion 140. Article of footwear 100 comprises knitted component 130 and sole system 110. Upper 120 is formed by stitching or otherwise attaching the ends of knitted component 130 at seam 127 in the forefoot region and the midfoot region and at seam 129 in the heel region to form a void for a wearer's foot.

In some embodiments, seam 127 and seam 129 resulting from the stitching or joining together of the sides of knitted component 130 may be located essentially on the longitudinal midline of article of footwear 100 if the size of knitted component 130 is essentially the same on each side of article of footwear 100, as illustrated in the drawing Figures herein. In other embodiments of the disclosure, the seam may be located anywhere on the surface of upper 120. Such an adjustment can be made by making one side of knitted component 130 wider than the other.

Line of demarcation 117 illustrates a dividing line between sole system 110 and other components of the article of footwear 100. Ground-engaging cleat member 115 protrudes away from the bottom side or surface 114 of one-piece knit outsole 112. First tensile element 161, second tensile element 162, third tensile element 163, and fourth tensile element 164 may be inlaid within knitted component 111. In some embodiments, one or more of tensile element 161, tensile element 162, tensile element 163, or tensile element 164 may be exposed on bottom surface 114.

In the embodiments illustrated in FIG. 1 through FIG. 7, the tensile elements may be located adjacent ground-engaging cleat members 115. Location of the tensile elements in this way may control stretching of the sole during use. For example, location of the tensile elements longitudinally may control lengthwise stretch of outsole 112. Further, locating a tensile element adjacent a ground-engaging cleat member may control stretch at the periphery of the base of the ground-engaging cleat member. Such stretch may be introduced by wear or as part of the manufacturing process, particularly the process by which the protuberance for the cleat member is formed in the knitted component. Extending the tensile element along a side of a plurality of cleat members also helps control stretching between cleats.

Figure 8:
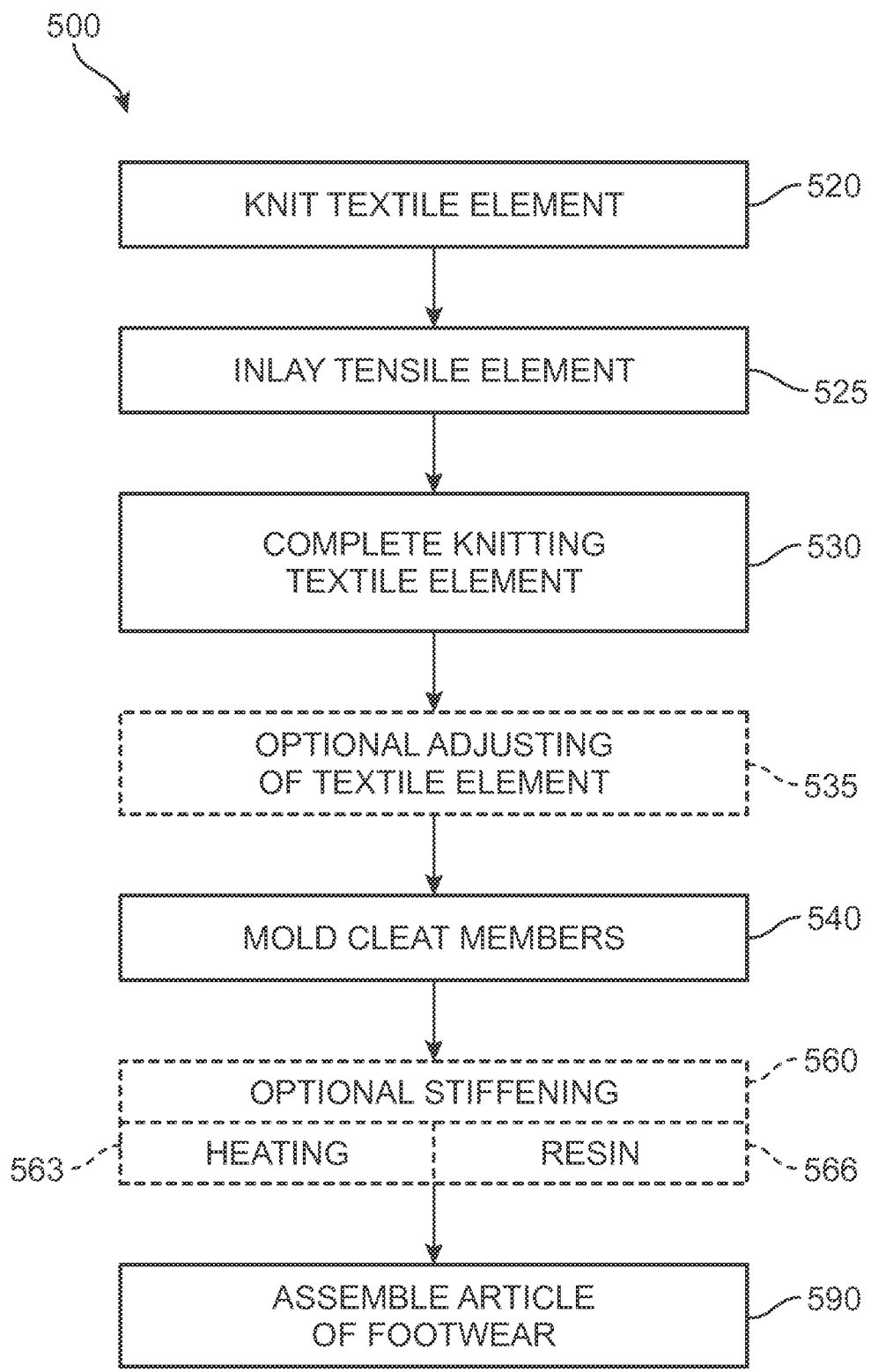
FIG. 8 is a schematic diagram of an exemplary embodiment of a method of making an article of footwear.

FIG. 8 is a block schematic diagram of a method 500 for manufacturing an article of footwear in accord with the disclosure. In accordance with the method of knitting a textile element (such as knitted component 111 and/or knitted component 130) is begun in step 520. As part of this knitting, a tensile element, such as tensile element 161, may be inlaid within the textile element in step 525. Knitting continues (step 530) until the textile element is complete. The tensile element may be adjusted in step 535. Ground-engaging cleat members are formed in step 540. The textile may be steamed to set the yarn, in accordance with known processes. Then, areas of the textile element may be stiffened at method step 560. Typically, such stiffening would be useful in areas of the textile element subject to heavy abrasion. Fusible yarn may be used in this area, for example, on portions of knitted components corresponding to protuberances forming ground-engaging cleat members. Fusible yarn may be heated at step 563 to soften the outer surfaces of the yarn. Alternatively, a stiffening resin or plastic may be applied and activated and cured or heated at step 566. Typically, stiffening resins or plastics are located so as not to interfere with adjustments by the tensile element. Then, the final folding, matching, sticking and adhering to form the article of footwear is carried out as step 590 to form an article of footwear.

In one aspect, the disclosure provides a sole system for an article of footwear. The sole system includes a knitted component incorporating a one-piece knit outsole. The knit outsole has a ground-facing side and a top side. A protruding ground-engaging cleat member is formed on the ground-facing side of the knit outsole. A tensile element may be inlaid within the knitted component so as to be accessible from the ground-facing side of the knit outsole.

In another aspect, the disclosure provides an article of footwear including the sole system. The article of footwear includes an upper and the sole system connected thereto. The upper may be one-piece or may have a strobel sock or other closure at the bottom of the upper. The top side of the outsole and the bottom of the upper are affixed.

The disclosure also provides an aspect including a method of making a sole system for an article of footwear. In accordance with the method, a ground-engaging member is formed in a one-piece knit outsole having a ground-facing side and a top side. A protruding ground-engaging cleat member is formed by molding the knitted component. A tensile element may be inlaid within the ground-facing side of the one-piece knit outsole.

Knitted component 111, knitted component 130, and foot-enclosing knit portion 140 can be formed of unitary knit construction having an inlaid tensile element. As used herein, the term "unitary knit construction" means that the respective component is formed as a one-piece element through a knitting process. In some embodiments, a tensile element is inlaid within the knitted component. That is, the knitting process substantially forms the various features and structures of unitary knit construction, including inlaying of a tensile element, without the need for significant additional manufacturing steps or processes. A unitary knit construction may be used to form a knitted component having structures or elements that include one or more courses of yarn or other knit material that are joined such that the structures or elements include at least one course in common (i.e., sharing a common yarn) and/or include courses that are substantially continuous between each of the structures or elements. With this arrangement, a one-piece element of unitary knit construction is provided. Examples of various configurations of knitted components and methods for forming knitted components with unitary knit construction are disclosed in U.S. Pat. No. 6,931,762 to Dua; U.S. Pat. No. 7,347,011 to Dua, et al.; U.S. Patent Application Publication 2008/0110048 to Dua, et al.; U.S. Patent Application Publication 2010/0154256 to Dua; and U.S. Patent Application Publication 2012/0233882 to Huffa, et al.; each of which is incorporated herein by reference in its entirety. Knitted component 111, knitted component 130, foot-enclosing knit portion 140, and tensile element 161 remain formed of unitary knit construction when other elements, such as logos, trademarks, placards with care instructions or other information, such as material information and size, tensile or structural elements, are added following the knitting procedure.

In still another aspect, the disclosure provides a foot-enclosing sole system for an article of footwear. The sole system includes a one-piece foot-enclosing knit portion that encloses the foot and includes a knit outsole. The knit outsole has a ground-facing side and a top side. A tensile element may be located on the ground-facing side. A ground-engaging cleat member protrudes from the ground-facing side of the outsole.

Various methods, machines, and tools can be used for forming, treating, and otherwise adjusting knitted component 111 and for forming article of footwear 100 incorporating one-piece knit outsole 112, including tensile element 161 inlaid therein. It will be appreciated that the order of steps within the method may vary from the order described herein. Certain steps or aspects of some steps may be skipped or eliminated as well. Moreover, two or more steps within the method may be carried out sequentially or simultaneously. Furthermore, the steps within the method may be carried out manually or automatically, using any suitable tool, machine, or implement.

Figure 9:
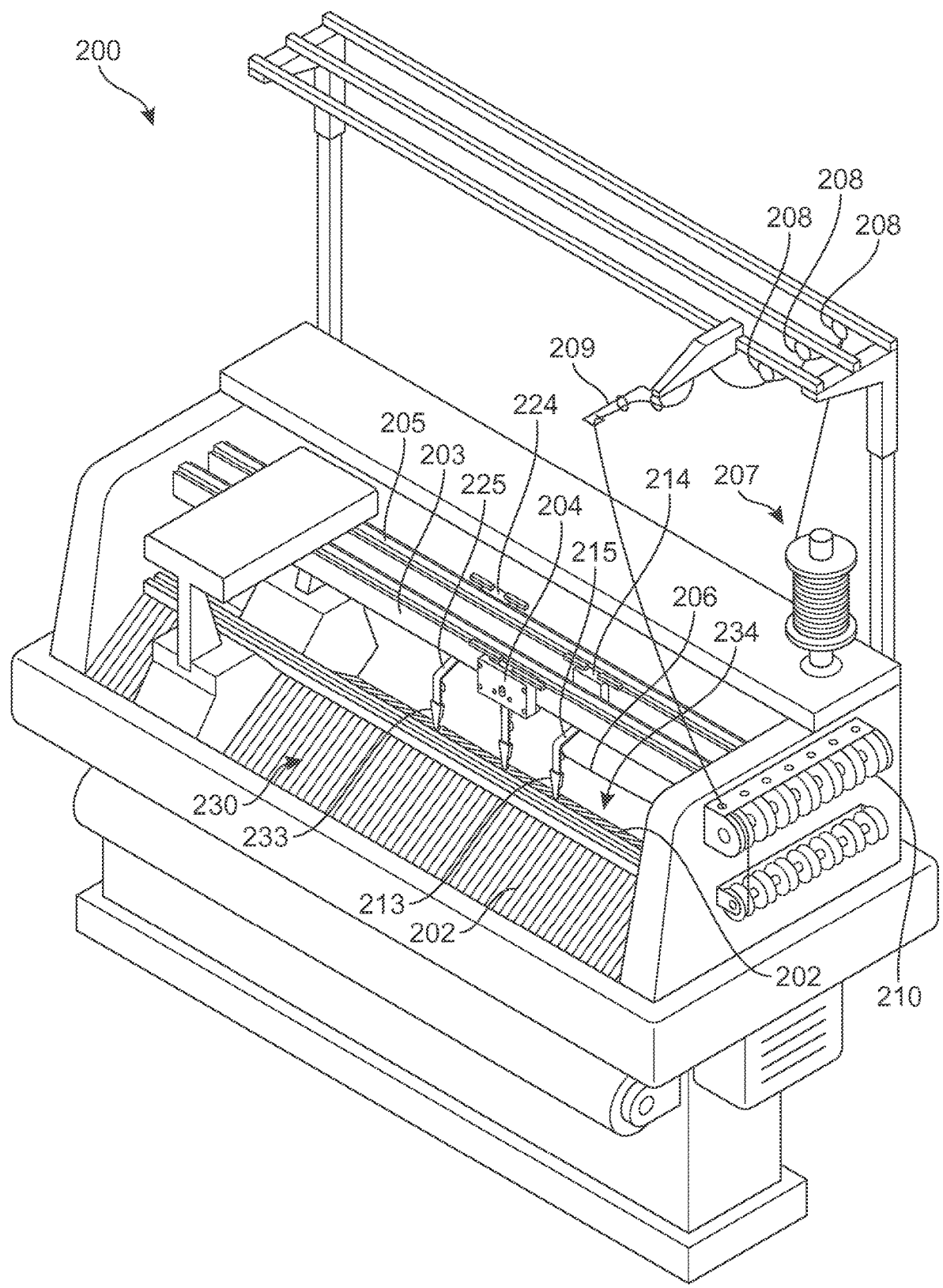
FIG. 9 is a perspective view of a knitting process using conventional feeders and a combination feeder.
Figure 10:
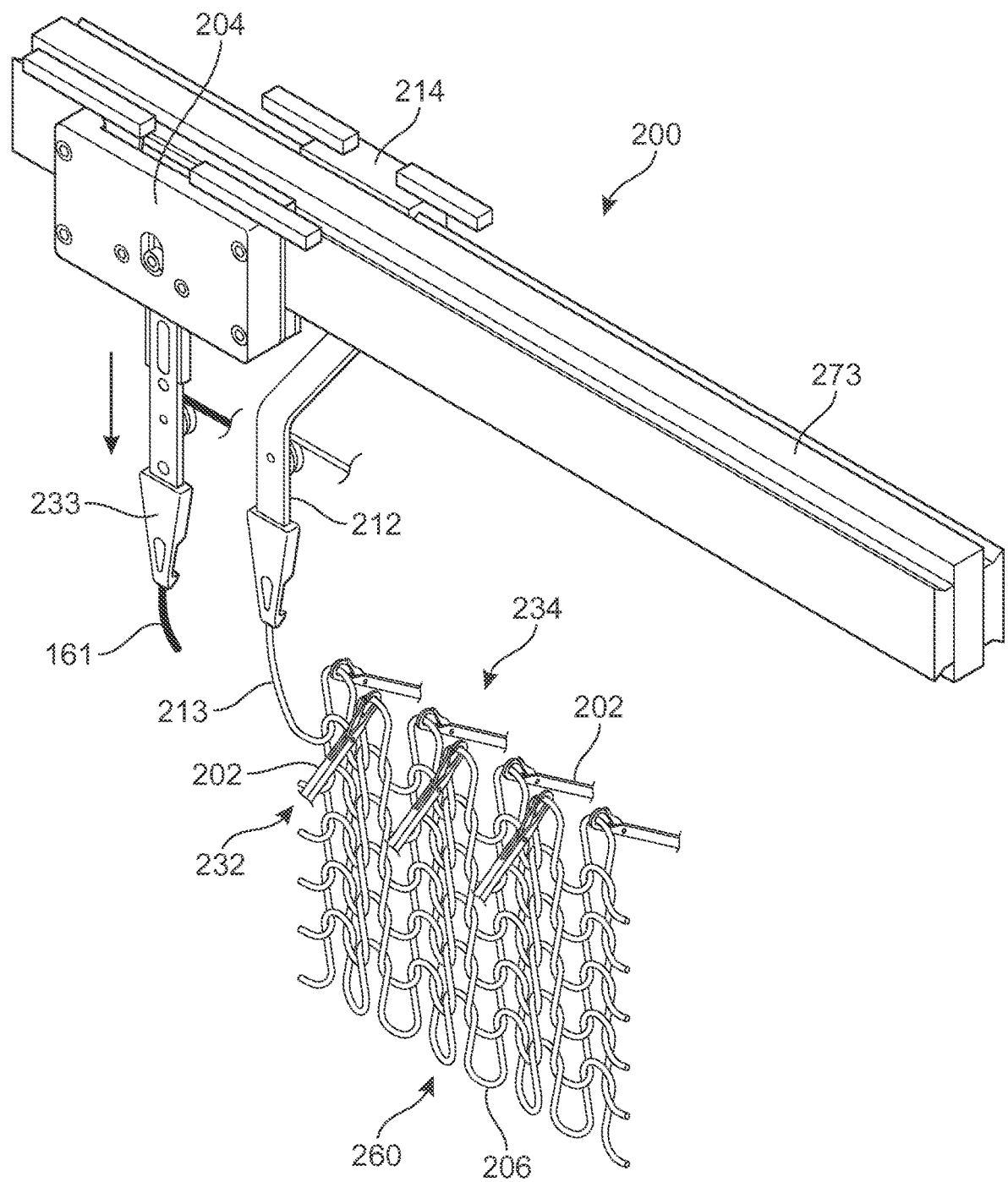
FIG. 10 is a perspective view of a portion of a knitting process using conventional feeders and a combination feeder.

FIG. 9 and FIG. 10 illustrate an exemplary process of knitting a knitted component, including a knitted component substantially similar to knitted component 111, knitted component 130, and foot-enclosing knit portion 140 described above. Although knitting may be performed by hand, the commercial manufacture of knitted components is generally performed by knitting machines. An example of a knitting machine 200 that is suitable for producing any of the knitted components described herein is depicted in FIG. 9. Knitting machine 200 has a configuration of a V-bed flat knitting machine for purposes of example, but any of the knitted components described herein may be produced on other knitting machines.

Knitting machine 200 includes first needle bed 232 and second needle bed 234 having needles 202 that are angled with respect to each other, thereby forming a V-bed. That is, needles 202 from first needle bed 232 lay on a first plane, and needles 202 from the second needle bed 234 lay on a second plane. The first plane and the second plane are angled relative to each other and meet to form an intersection that extends along a majority of a width of knitting machine 200. As described in greater detail below, needles 202 each have a first position where they are retracted and a second position where they are extended. In the first position, needles 202 are spaced from the intersection where the first plane and the second plane meet. In the second position, however, needles 202 pass through the intersection where the first plane and the second plane meet.

Figure 11:
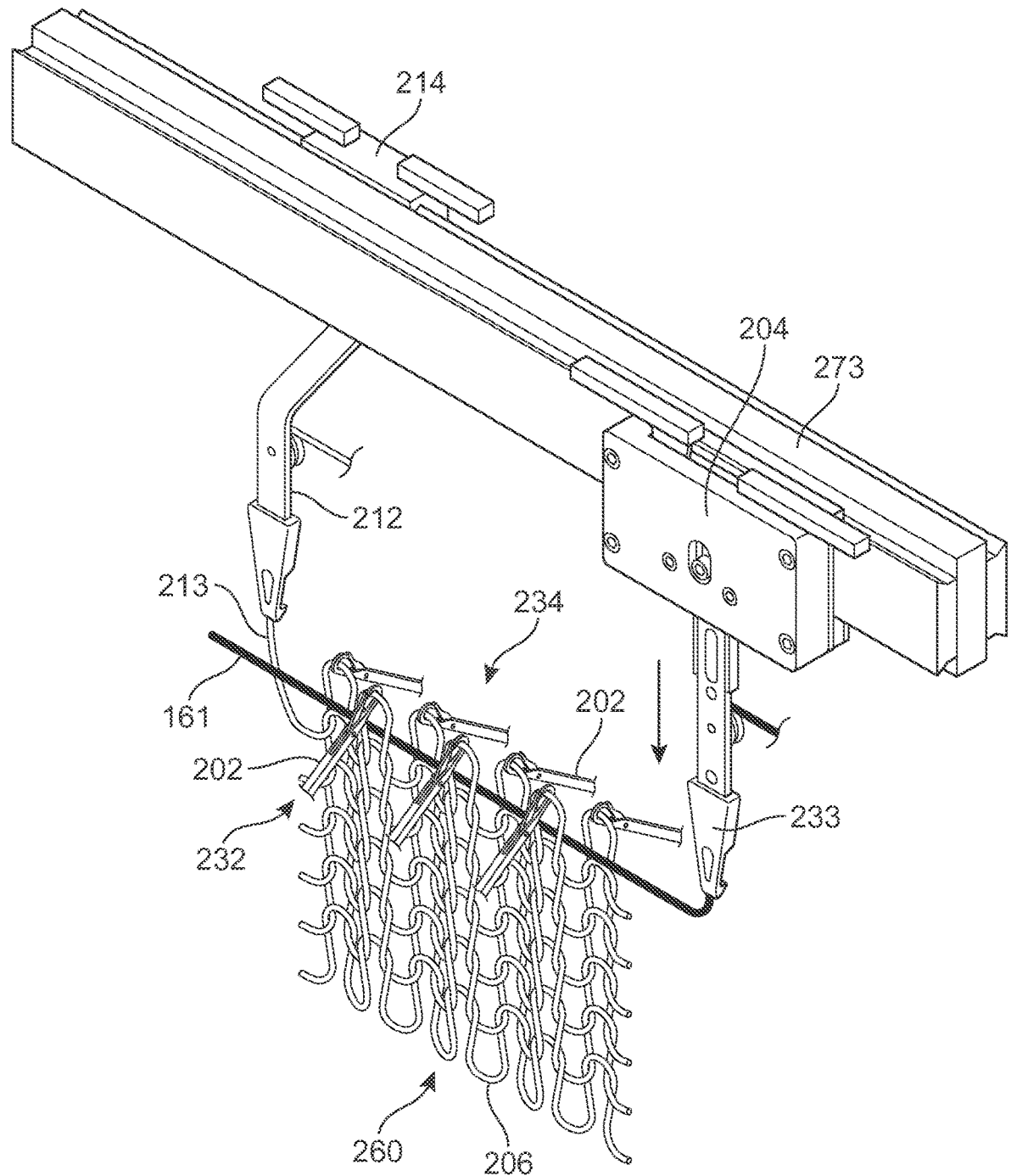
FIG. 11 is a perspective view of a portion of a knitting process using conventional feeders and a combination feeder.

Rail 203 and rail 205 extend above and parallel to the intersection of needles 202 and provide attachment points for first standard feeder 214. Rail 203 and rail 205 each have two sides, each of which may accommodate one standard feeder. Therefore, knitting machine 200 may include a total of four feeders. Three such feeders are illustrated in FIG. 9. Combination feeder 204 is on the front of rail 203, first standard feeder 214 is on the front of rail 205, and second standard feeder 224 is on the back of rail 205. Although two rails are depicted, additional rails could be present. Such additional rails would accommodate additional feeders. Such feeders may be useful to manufacture embodiments including two or more types of yarn. These additional feeders are supplied with yarn and are operated in the same way as the feeders described in detail. FIG. 10 and FIG. 11 illustrate a different arrangement of feeders and rails, wherein combination feeder 204 is on the front of rail 273 and first standard feeder 214 is on the back of rail 273. These and other arrangements are available for use with the various knitting techniques.

First standard feeder 214 moves along rail 205 and needle beds 232 and 234, thereby supplying yarn to needles 202. Yarn 206 is provided to feeder 204 by a spool 207. More particularly, yarn 206 extends from spool 207 to various yarn guides 208, yarn take-back spring 209, and yarn tensioner 210 before entering first standard feeder 214. Although not depicted, additional spools 207 may be utilized to provide yarns to other feeders.

Standard feeders are conventionally utilized for a V-bed flat knitting machine 200. Each standard feeder has the ability to supply yarn that needles 202 manipulate to knit, tuck, and float. In some embodiments, only one feeder may be needed. In other embodiments, such as when the ground-engaging cleat members are knitted into the one-piece outsole, more than one feeder may be utilized. For such embodiments, a knitting machine 200 in FIG. 9 may include first standard feeder 214, second standard feeder 224, and first combination feeder 204. The standard feeders are substantially similar to each other; each introduces yarn that can be manipulated to knit, tuck, and float. The combination feeder has these abilities, and also has the ability to inlay a yarn. First standard feeder 214 may be secured to a front side of rail 205, second standard feeder 224 may be secured to the back side of rail 205, and first combination feeder 204 may be secured to a rear side of rail 203. In other embodiments of the disclosure, additional feeders may be used and may be located on the front or rear side of rail 203 or rail 205.

In this embodiment, first yarn 206 from spool 207 passes through first standard feeder 214 and an end of yarn 206 extends outwardly from first dispensing tip 213 at the end of first feeder arm 212. Although yarn 206 is depicted, any other strand (e.g., a filament, thread, rope, webbing, cable, chain, or yarn) may pass through first standard feeder 214. A second yarn (not shown) similarly passes through second standard feeder 224 and extends outwardly from second dispensing tip 233 on second feeder arm 215. A third yarn or tensile element (not shown) may pass in a similar manner through first combination feeder 204 to third dispensing tip 254 on third feeder arm 227.

Needles 202 are manipulated to form loops 206, with a plurality of loops forming knitted component 260. The knitting process discussed herein relates to the formation of a knitted component 260, which may be any knitted component, including knitted components that are similar to knitted component 111, knitted component 130, and foot-enclosing knit portion 140, and having an inlaid tensile element 161. For purposes of the discussion, only a relatively small section of knitted component 260 is shown in the Figures in order to permit the knit structure to be illustrated. Moreover, the scale or proportions of the various elements of knitting machine 200 and knitted component 260 may be enhanced to better illustrate the knitting process.

First standard feeder 214 includes first feeder arm 212 with first dispensing tip 213, as shown in FIG. 9, FIG. 10, and FIG. 11. First feeder arm 212 is angled to position first dispensing tip 213 in a location that is (a) centered between needles 202 and (b) above an intersection of needle beds 201. Note that needles 202 lay on different planes, which planes are angled relative to each other. That is, needles 202 lay on the different planes of first needle bed 232 and second needle bed 234. Needles 202 each have a first position in which needles 202 are retracted, and a second position, in which needles 202 are extended. In the first position, needles 202 are spaced from the intersection where the planes upon which needle beds 201 meet. In the second position, however, needles 202 are extended and pass through the intersection where the planes upon which needle beds 201 meet. That is, needles 202 cross each other when extended to the second position. It should be noted that first dispensing tip 213, second dispensing tip 223, and third dispensing tip 233, are located above the intersection of the planes. In this position, first dispensing tip 213 and second dispensing tip 254 dispense yarn to needles 202 for purposes of knitting, tucking, and floating. Third dispensing tip 233 dispenses yarn to needles 202 for the purposes of knitting, tucking, floating, and inlaying.

Referring again to FIG. 10 and FIG. 11, first standard feeder 214 moves along rail 273 and a new course is formed in knitted component 260 from yarn 206. More particularly, needles 202 pull sections of yarn 206 through the loops of the prior course, thereby forming the new course. Accordingly, courses may be added to knitted component 260 by moving standard feeder 204 along needles 202, thereby permitting needles 202 to manipulate yarn 206 and form additional loops from yarn 206.

FIG. 10 and FIG. 11 further illustrate inlaying of tensile element 161. In FIG. 10, tensile element 161 extends a short distance from feeder 233 in preparation of inlaying tensile element 161 within the previously formed course of knitted component 260. FIG. 11 illustrates the result of translating first combination feeder 204 from left (FIG. 10) to right (FIG. 11), thereby inlaying tensile element 161 within knitted component 260.

The processes and methods for knitting a knitted component described and illustrated herein are exemplary and are not meant to be exhaustive. Therefore, it should be understood that additional knitted components including the features of the embodiments described herein, as well as similar knitted components including the features of the embodiments described herein, as well as similar knitted components not explicitly described herein, may be made using one or more knitting processes substantially similar to the knitting method for knitted component s described herein or in the documents incorporated by reference.

Knitted components described herein can be formed from at least one yarn that is manipulated (e.g., with a knitting machine) to form a plurality of intermeshed loops that define a knitted component having a variety of courses and wales. Thus, adjacent areas of a knitted component can share at least one common course or at least one common wale. That is, knitted components can have the structure of a knitted textile. It will be appreciated that the knitted components can be formed via weft knitting operations, including flat knitting operations and circular knitting operations, warp knitting operations, or other suitable methods.

The knitted components may incorporate various types and combinations of stitches and yarns. With regard to stitches, the yarn forming the knitted components may have one type of stitch in one area of a knitted component and another type of stitch in another area of the knitted component. Depending upon the types and combinations of stitches utilized, areas of knitted components may have a plain knit structure, a mesh knit structure, or a rib knit structure, for example. The different types of stitches may affect the physical properties of a knitted component, including aesthetics, stretch, thickness, air permeability, and abrasion-resistance. That is, the different types of stitches may impart different properties to different areas of the knitted component. With regard to yarns, the knitted component may have one type of yarn in one area of a knitted component 130 and another yarn in a different area of the knitted component.

Although embodiments of the disclosure have been described in detail as providing an upper comprising a single layer, the disclosure also contemplates uppers having plural layers. The plural layers may be fused, double-knit, or otherwise associated with each other.

Figure 12:
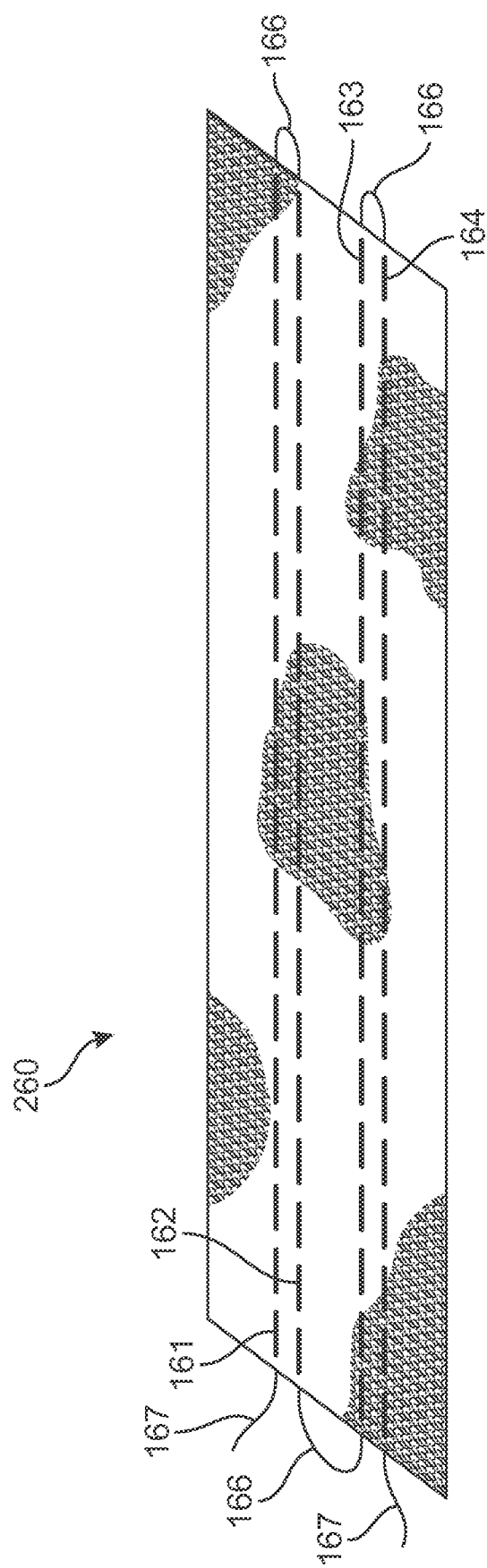
FIG. 12 is a perspective view of an exemplary embodiment of a knitted component.

FIG. 12 illustrates a portion of a knitted component 260, which may represent any of knitted component 111, knitted component 130, or foot-enclosing knit portion 140. In particular, the portion is that portion in which ground-engaging cleat member 115 will be formed, so it includes portions that will become one-piece knit outsole 112, and ground-engaging cleat member 115. The portion also includes first tensile element 161, second tensile element 162, third tensile element 163, and tensile element 164. The portion also includes tensile element loops 166, which represent the travel of the tensile element at the end of the knitted component from one location to another, and tensile element leads 167, which represent the travel of the tensile element at the beginning and end of the tensile element. Tensile element loops 166 and tensile element leads 167 may permit the inlaid tensile elements to be adjusted with the knitted component. In some embodiments, tensile element loops 166 and tensile element leads 167 may be removed from the edges of the textile element when the textile element is formed into a portion of an article of footwear. In some embodiments, tensile element loops 166 and tensile element leads 167 may be secured or attached to the bottom of the upper of the article of footwear.

Although the disclosure is described in detail as it relates to a knitted component for a sole system for an article of footwear, the principles described herein may be applied to any textile element to provide a knit surface on a protruding portion of an object to engage another object. For example, the principles may be applied to studs that protrude from the front or back of a glove or mitten to provide a secure grip on an object grasped with the glove or mitten. In such a case, the knitted component on the surface of the protruding object would not be ground-engaging, but rather would be object-engaging, and the tensile elements may be located analogously. The tensile element also may be located along or adjacent to the knuckles, across the palm, at the cuff, or any location amenable of adjustment, as described herein.

The disclosure also is described in detail as it relates to knitted textiles formed by weft knitting, but textiles formed by any suitable knitting process, including but not limited to: weft knitting processes, for example, flat knitting operations or circular knitting operations; warp knitting process; or any other knitting process suitable for providing a knitted textile, may be used.

A ground-engaging member may be formed on the knitted component in the sole system. The ground-engaging member protrudes from the ground-facing surface of the outsole. At least the bottom surface of the ground-engaging member engages the ground, and the sides of the ground-engaging member also may engage the ground.

In some embodiments, a ground-engaging member may be formed by stretching the knitted component in the area of the outsole where the ground-engaging member is to be located to form a protuberance. Typically, protuberances are found in the forefoot and in the heel, although protuberances may be placed anywhere on the outsole surface. If plural ground-engaging members are to be formed, they may be formed by stretching the knitted component individually, essentially simultaneously, in groups, or simultaneously to form the protuberances.

In some embodiments, a mold may be formed by any suitable method. The mold may have a single protuberance, or may have a protuberance for each ground-engaging member to be formed by the stretching operation. In other embodiments, two molds may be necessary. One mold may be used to form protuberances extending from the forefoot area, and the second mold may be used to form protuberances extending from the heel area.

In embodiments, all protuberances are formed essentially simultaneously. A mold may have a male part and a mated female part into which the male part is pressed. The knitted component is placed in an open mold, typically on the female part of the open mold. The knitted component is located so that the portion of the knitted component that forms the bottom of the sole is appropriately registered with the portions of the female mold that form the protuberances. The mold ensures that the knitted component is retained at the edges so that the protuberances are formed by stretching, rather than by forcing extra textile into the cavity and wrinkling the remainder of the knitted component. Then, the male part of the mold is pressed into the knitted component and into the female part of the mold to form the protuberances in the sole. The mold parts then are separated, and the knitted component with protuberances is advanced for further processing.

The tensile elements may be manipulated to adjust the tension in a portion of a knitted component. The wearer may adjust the tension to provide a secure fit by adjusting longitudinal (along the length of an article of footwear) tension, lateral (across the width of the article of footwear) tension, or both. Such adjustments also may be made to compensate for any slackness that develops during wear and use of the article of footwear. The tensile elements also may be used to adjust tension in the shoe outsole in the area of cleat members or other protuberances.

FIG. 13 through FIG. 16 illustrate exemplary embodiments of adjusting tensile elements to increase longitudinal (FIG. 13 and FIG. 14) tension or both longitudinal and lateral (FIG. 15 and FIG. 16) tension. These are merely several exemplary embodiments of how the tensile elements can be used in an article of footwear.

Figure 13:
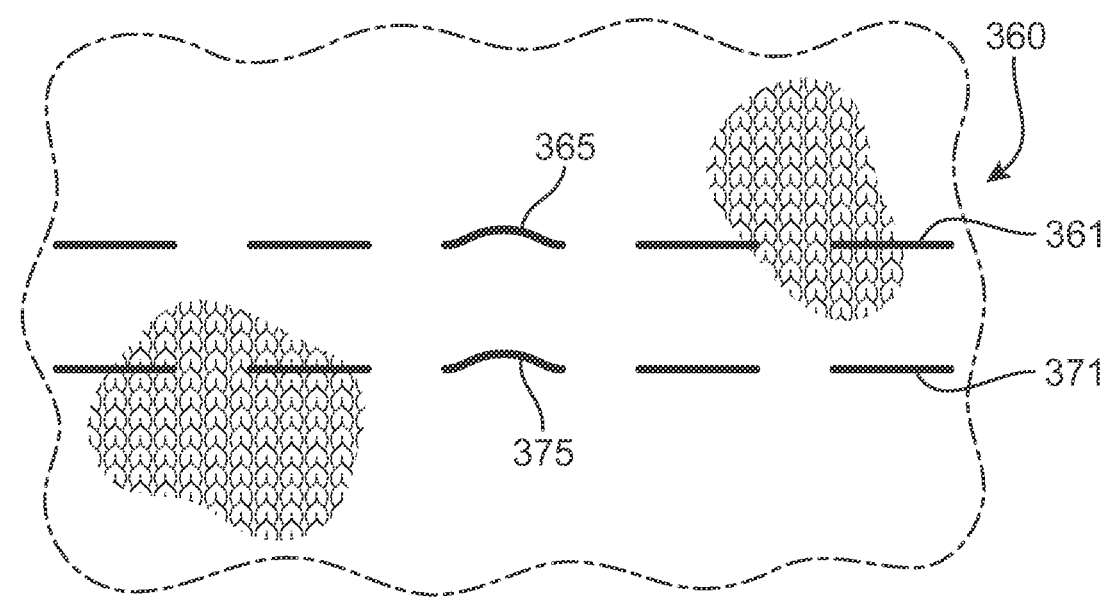
FIG. 13 is a view of a section of a knitted component including a tensile element.

FIG. 13 illustrates equal adjustment of adjacent tensile elements. Knitted component 360 includes tensile element 361 and tensile element 362. Portions of the tensile elements are shown. FIG. 13 illustrates equal tension being introduced into adjacent tensile element 361 and tensile element 371 by pulling on them equally, thus forming loop 365 in tensile element 361 and loop 375 in tensile element 371. Increasing the size of the loop increases the tension in the tensile element, and thus in the affected region of knitted component 360.

In some embodiments, the loops can be made by pulling the tensile element with the fingers or a suitable tool. The loop may be pulled away from the ground-engaging surface, may be pulled parallel to the surface of the sole, or may be pulled at any angle.

Figure 14:
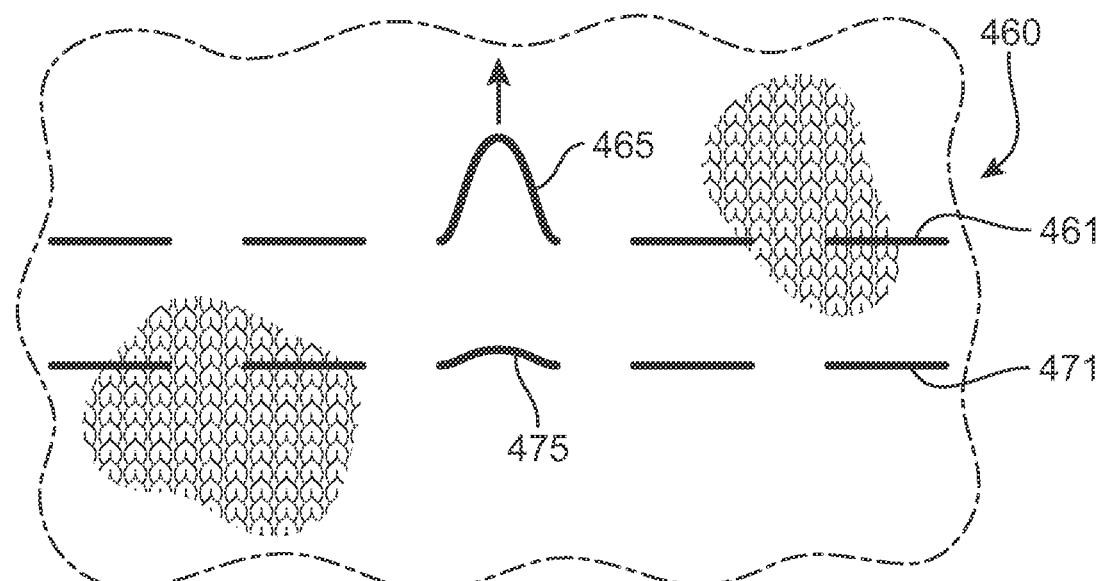
FIG. 14 is a view of the section of a knitted component illustrated in FIG. 13, wherein a tensile element is pulled to create more tension in the tensile element.

FIG. 14 illustrates an exemplary process of introducing additional tension into a single tensile element. As can be seen, loop 465 is larger than loop 475. Therefore, more tension is introduced into tensile element 461 by loop 465 than is introduced into tensile element 471 by loop 475, as loop 475 is much larger than loop 465. In various embodiments, the loops may extend in any direction.

Figure 15:
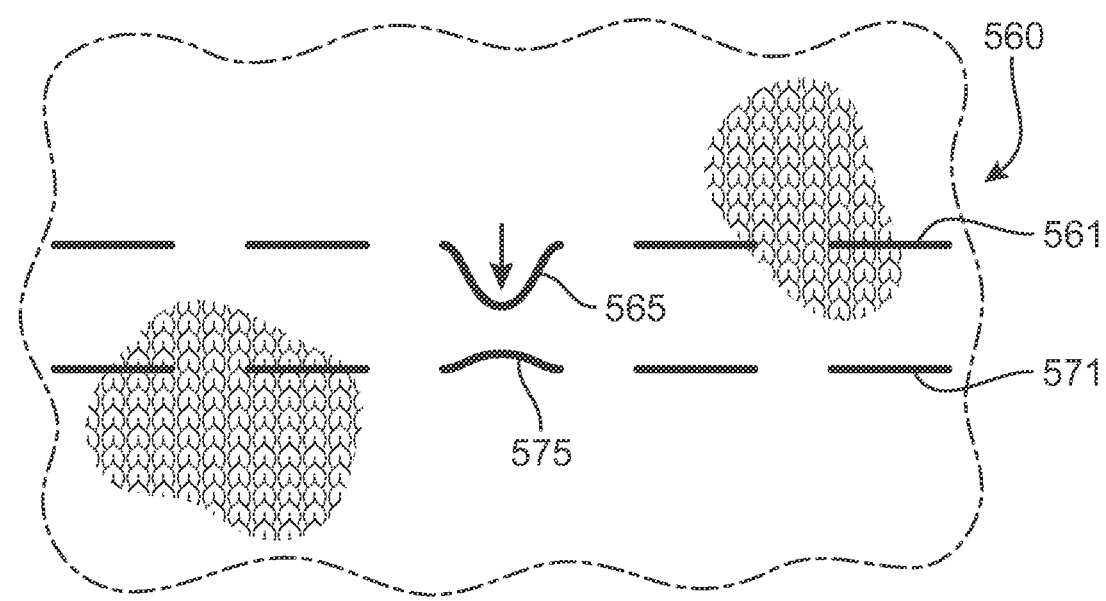
FIG. 15 is a view of a section of a knitted component wherein a tensile element is pulled toward another tensile element to create tension.
Figure 16:
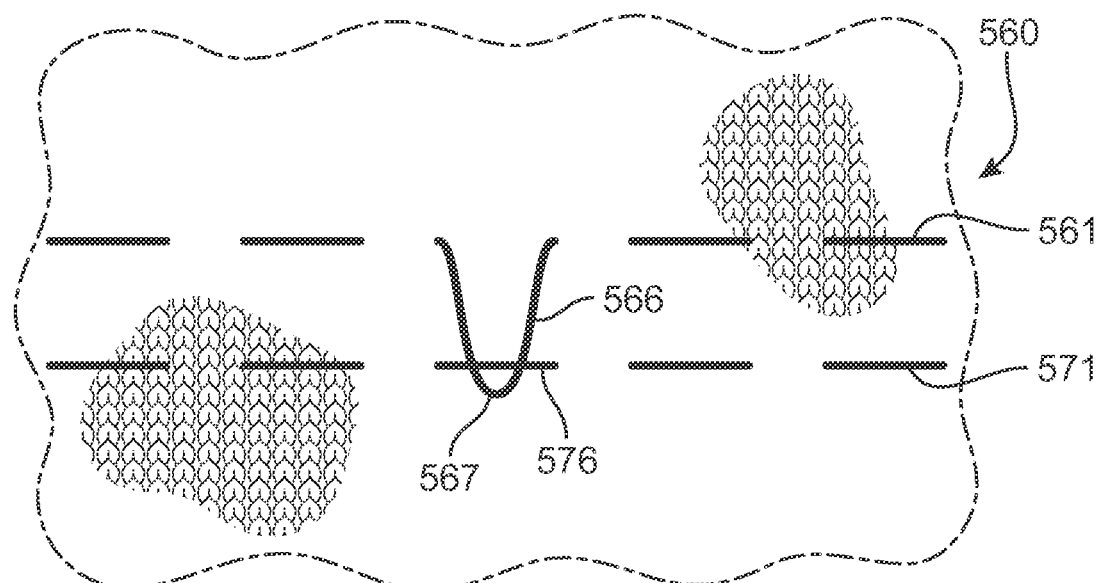
FIG. 16 is a view of a section of FIG. 15 wherein the other tensile element is pulled to form a loop that is secured under another tensile element.

FIG. 15 and FIG. 16 illustrate two steps of a process to introduce tension both longitudinally and laterally. As shown in FIG. 15, a small loop 575 is introduced into tensile element 571. A larger loop 565 is introduced in tensile element 561. Loop 565 in tensile element 561 is pulled in the direction of the other tensile element, tensile element 571, and is pulled across the surface of the outsole.

In a second step illustrated in FIG. 16, loop 566 is pulled sufficiently to entrap the top 567 of loop 566 under tensile element 571 at loop 576. Loop 576 then is eliminated to hold the top 567 of loop 566. This arrangement introduces both longitudinal and lateral tension into this area of outsole 114.

Figure 17:
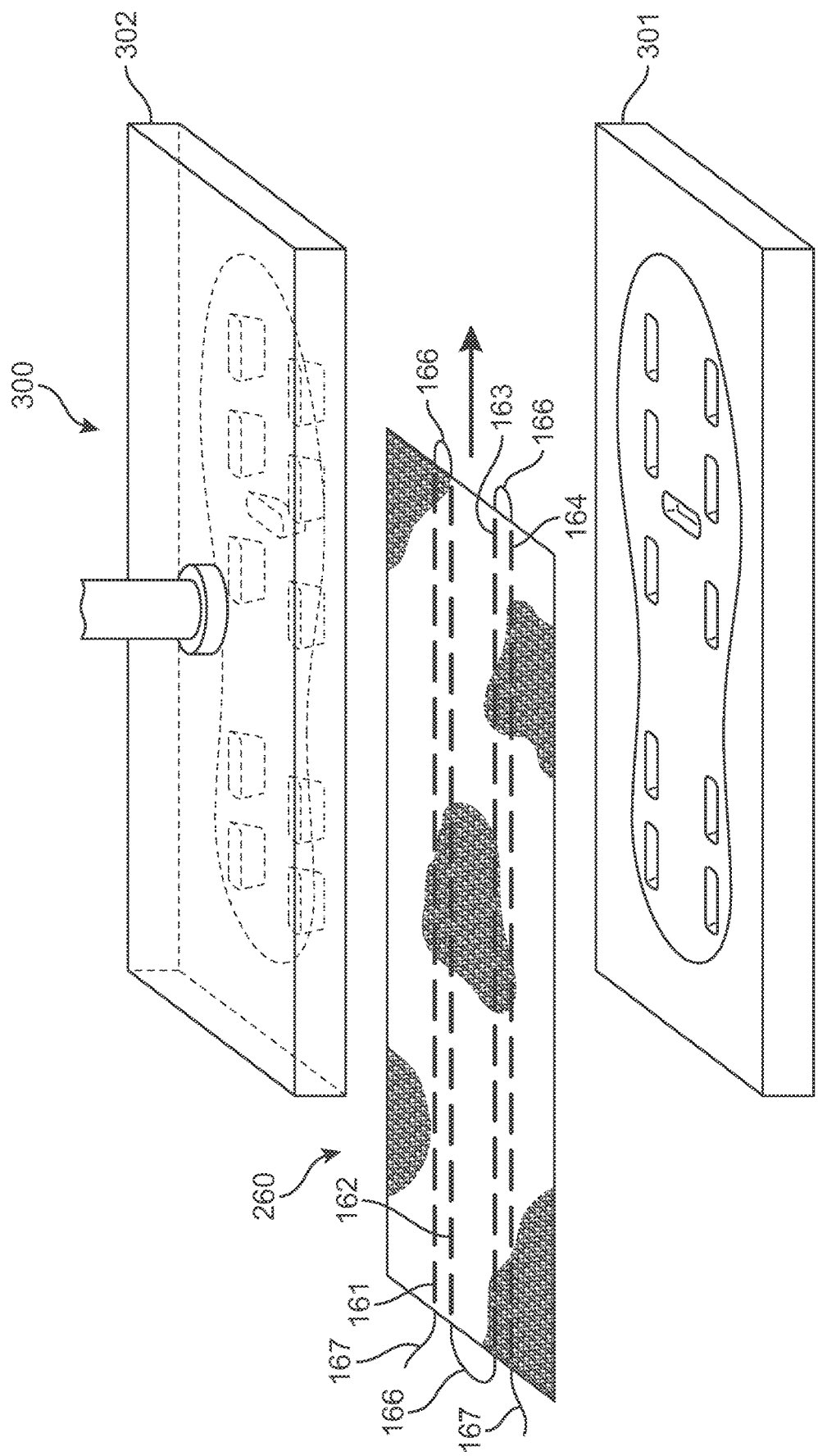
FIG. 17 is a view of a mold and a knitted component to be molded to form cleat members.
Figure 18:
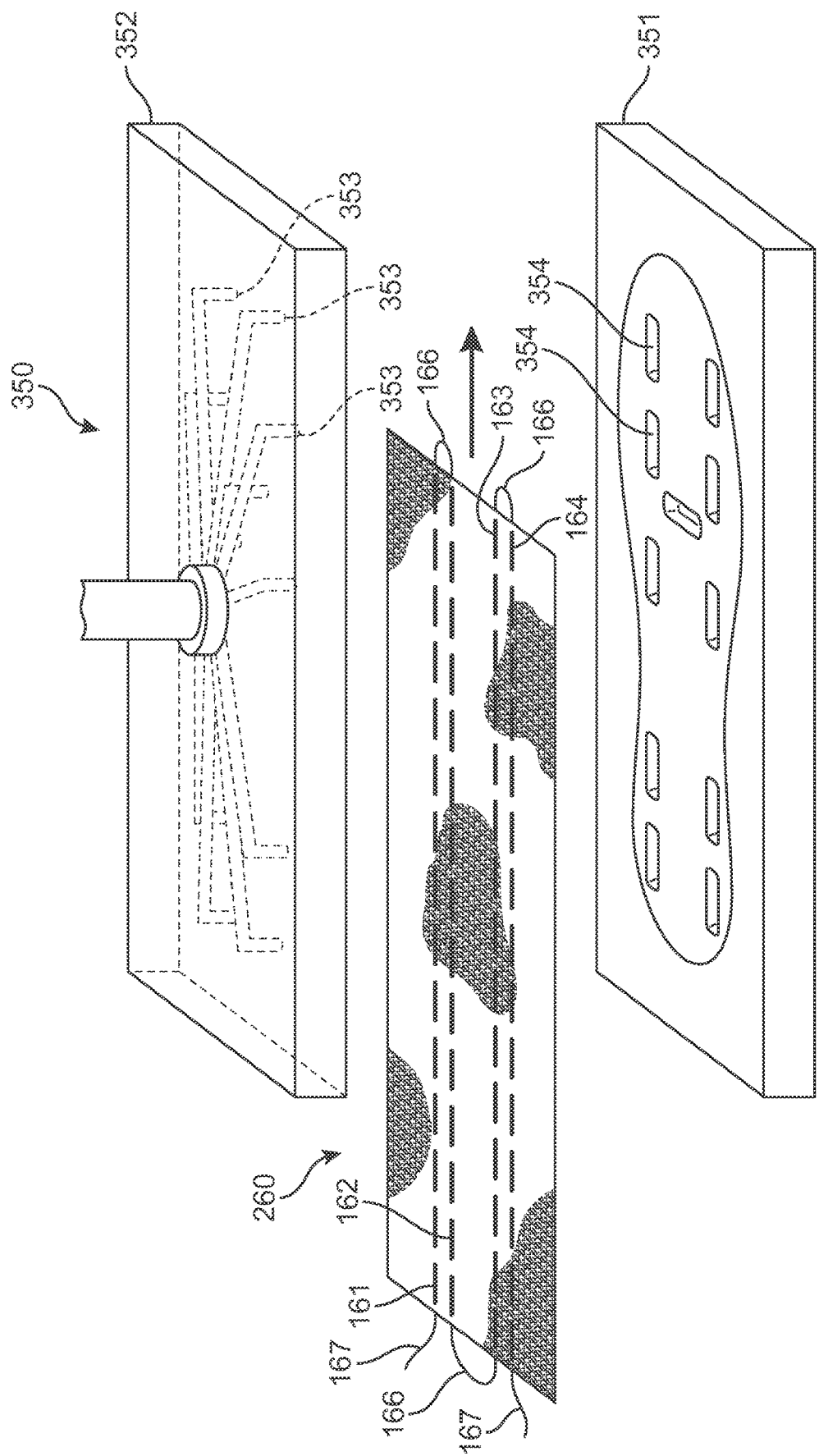
FIG. 18 is a view of a mold and a knitted component to be molded by injecting material to form cleat members.
Figure 19:
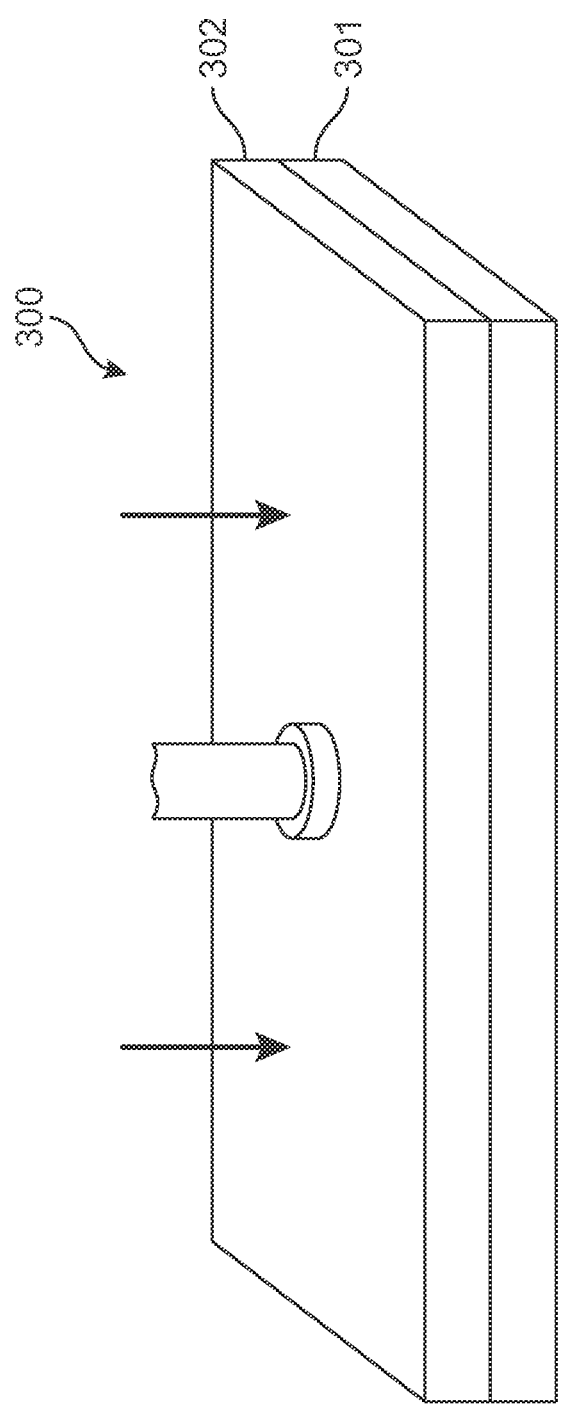
FIG. 19 is a view of a mold closed on a knitted component to form cleat members.

FIG. 17 through FIG. 20 illustrate the method steps by which ground-engaging cleat members may be formed. As shown in FIG. 17, mold 300 is open, and knitted component 260, including first tensile element 161, second tensile element 162, third tensile element 163, fourth tensile element 164, tensile element loops 166, and tensile element leads 167, is placed between mold male part 302 and mold female part 301, as shown by the direction of the arrow. FIG. 19 illustrates that male mold part 302 and female mold part 301 are moved together to press knitted component 260 therebetween. As seen in FIG. 19, the mold is closed and the mold secures the edges of knitted component 260 to ensure that knitted component 260 is stretched to form ground-engaging cleat members 115 when the mold is closed.

Figure 20:
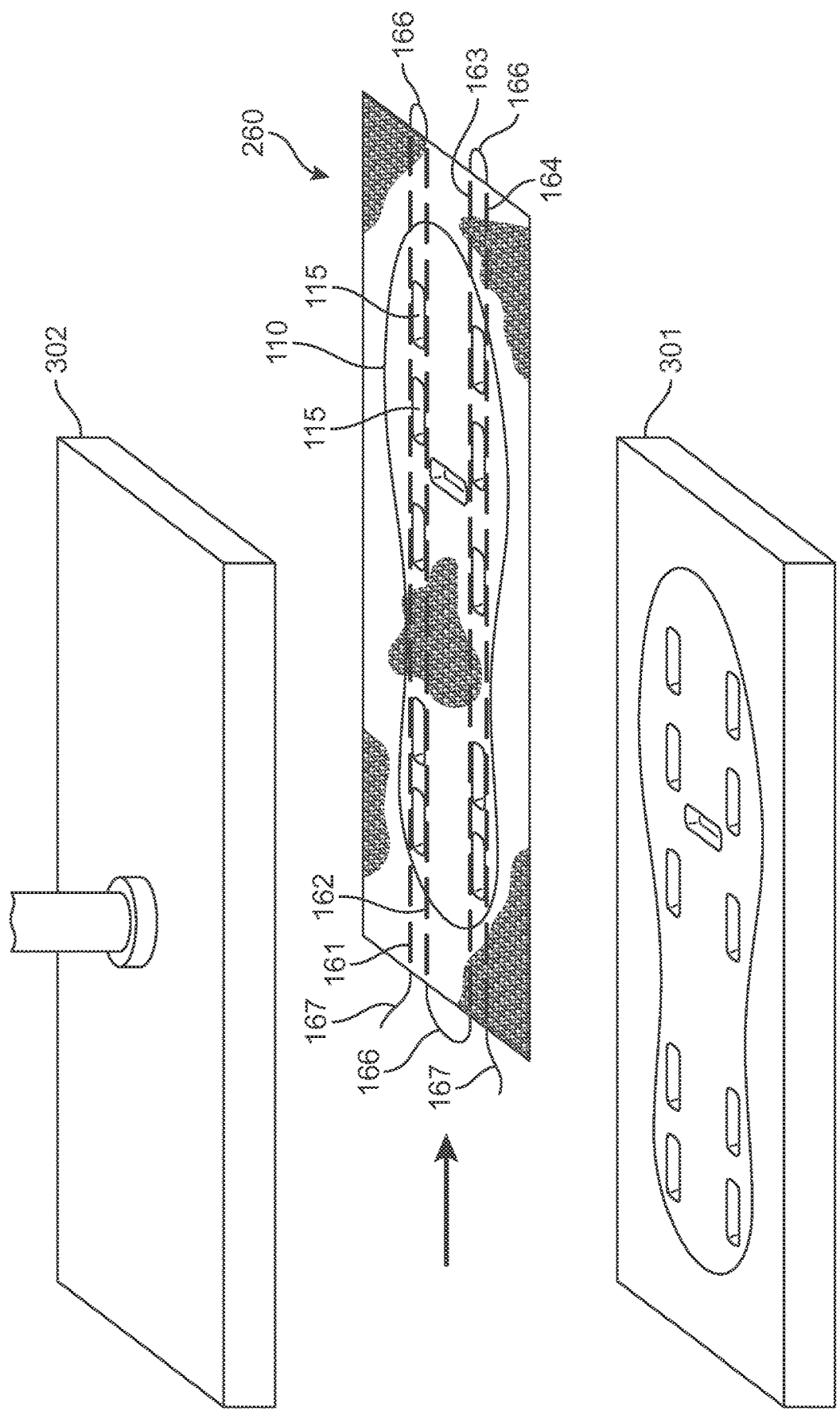
FIG. 20 is a perspective view of a molded knitted component removed from the mold.

FIG. 20 illustrates that the mold parts have been separated, and one-piece outsole 112 has formed. In particular, the top surface of the outsole 113 and ground-engaging cleat member 115 are visible as the knitted textile is removed in the direction of the arrow from the separated mold. First tensile element 161, second tensile element 162, third tensile element 163, forth tensile element 164, tensile element loops 166, and tensile element leads 167 also are illustrated.

In other embodiments, all protuberances may be formed essentially simultaneously by injection molding. Injection molding uses a fluid under pressure to form protuberances in a surface, here the knitted component. Injection molding may be used to inject materials such as elastomers and thermoplastic and thermosetting polymers. The knitted component is held in place and the knitted component is stretched to form the protuberances. Typically, thermoplastic polymers are used because such materials are well-suited for injection molding. Thermoset materials may react too quickly or not quickly enough while being injected. Further, thermoplastic polymers may be re-used and recycled, thus making such material an environmentally sensitive choice.

A knitted component is correctly oriented on the female mold part. Then, the mold is closed. The other part of the mold contains runners and other tubes for delivering the injected material through nozzles to the mold cavity. Heated material is forced into the mold cavity to stretch the knitted component and form the protuberances. The material cools and hardens to the configuration of the protuberances. The molds then are separated and the molded knitted component is removed.

In some embodiments, the injected material remains in the protuberances and provides rigidity. In some such embodiments, an additional feature such as a shank may be formed between the forefoot portion and the heel portion. The shank may provide additional rigidity to the outsole and thus to an article of footwear made with the sole system. In other embodiments, the injected material may be removed from the protuberances. In some such embodiments, the protuberances may be filled with another rigid material, or may be filled with soft material to provide a perception of cushioning.

FIG. 18 discloses another embodiment for forming ground-engaging cleat member 115. Mold 350 includes female part 351 and injectors 352 including nozzles 353. Each nozzle 353 corresponds with a cavity 354 shaped to form a ground-engaging cleat member 115. Knitted component 260, including first tensile element 161, second tensile element 162, third tensile element 163, fourth tensile element 164, tensile element loops 166, and tensile element leads 167, is placed between the injection nozzles, as shown by the arrow. Then, the mold parts are brought together and a material is injected from nozzles 353 into cavities 354 to form ground-engaging cleat members 115.

The material injected may be left in a ground-engaging cleat member 115 to provide additional support. Also, the individual pieces of injected material may be connected by a sprue or another manner. A mass of injected material also may be used to form a structure that will attenuate forces from the ground-engaging cleat member 115 reinforcement into the wearer's foot. A skilled practitioner will be able, with the guidance provided herein, to select suitable materials for this purpose.

Figure 21:
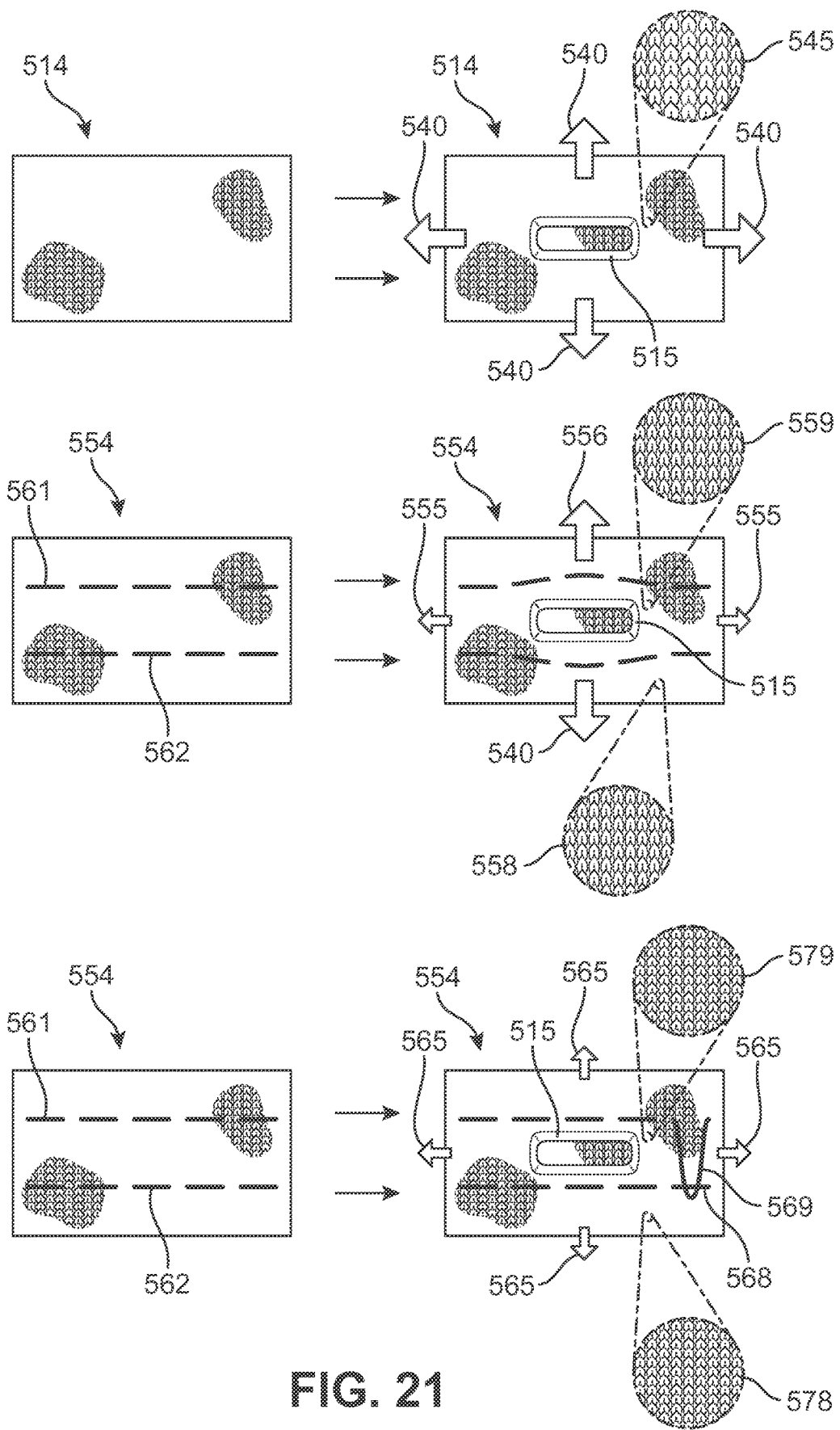
FIG. 21 is a comparison of tensile elements that apply force in different directions, including a close-up of relevant knit patterns.

FIG. 21 illustrates a representation of a tensile element inlaid within the sole of a knitted component used to reduce differences in stress in an outsole. The top panel illustrates how formation of cleat 115 in outsole portion 514 introduces stress into the knitted structure. Unstressed outsole portion 514 on the left then is moved into a press, such as that illustrated in FIG. 17, as indicated by the movement arrows. When cleat 515 is formed by pressing, the area surrounding the cleat is subjected to essentially equal stress in all directions, thus causing approximately equal stretching of the knitted component in the area of the cleat. This approximately equivalent stretch is illustrated by expanded view 545 and arrows 540, which, by their relative size, illustrate approximately equal stress in all directions.

The center panel on FIG. 21 illustrates knitted component 554 having tensile element 561 and tensile element 562 inlaid therein. Cleat 555 is formed by pressing down, displacing tensile element 561 and tensile element 562 and introducing stress, as indicated by different arrows 556 and 555. The magnitude of this stress introduced into knitted component 554 is greater in the lateral direction (arrows 556) than in the longitudinal direction (arrows 555). Knitted component 554 is stretched close to cleat 515, as illustrated in magnified view 559. The amount of stress in this location can be compared to the lack of stress in magnified view 558.

The bottom panel of FIG. 21 illustrates how the tensile elements may be used to restore a knitted component to typical stress or tension levels. Knitted component 554 having tensile element 561 and tensile element 562 inlaid therein is pressed (movement arrows) to form cleat 515. To reduce the stress introduced by the pressing, loop 569 in tensile element 561 is pulled to reduce the lateral stress. Loop 569 is pulled along the surface of knitted component 554 and then secured under tensile element 162, such as at 568, to retain the tension. Re-establishment of more typical stress distribution is illustrated by equal-sized force arrows 565 and by enlarged view of the knitted surface at 578 and 579. Enlarged view 578 illustrates a typical knit pattern away from cleat 515, as was found in enlarged view 558. Further, enlarged view 579 illustrates stress on knitted component 514 in the vicinity of cleat 515. The stress pattern at enlarged view essentially matches that at magnification 578 away from cleat 515. This is because tensile element 162 has been adjusted to relieve this stress.

Figure 22:
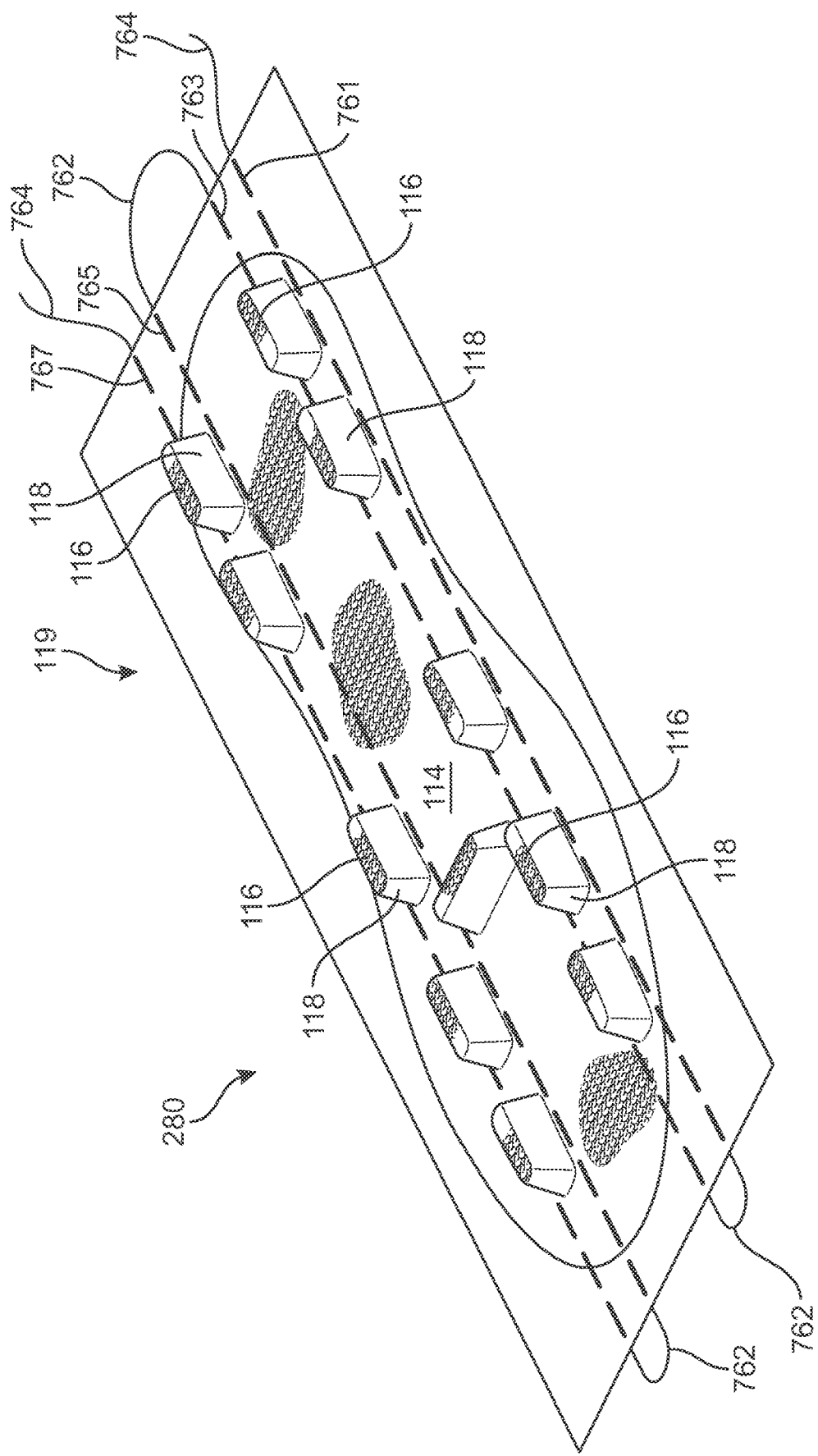
FIG. 22 is a perspective view of a bottom of a knitted component.

FIG. 22 illustrates knitted component 280, another embodiment of a knitted component. In this embodiment, ground-engaging cleat members 118 are knit into the one-piece knit outsole. Therefore, there is less stress in the textile in the vicinity of the ground-engaging cleat members, and in the ground-engaging cleat members. In this embodiment, ground-engaging cleat members 118 are knitted into one-piece knit outsole 112 as pockets or cavities extending from bottom surface 114 of the outsole. Each of ground-engaging cleat members 118 may be knitted from the same yarn as the remainder of the outsole 112; other embodiments may form pockets using a different yarn. Such embodiments may require more than one feeder on knitting machine 200. First tensile element 761, second tensile element 763, third tensile element 765, fourth tensile element 767, tensile element loops 762, and tensile element leads 764 also are illustrated in FIG. 22 as adjacent to cleat members 118. Tensile element loops 762 and tensile element leads 764 illustrate the path the inlaid tensile element takes during the knitting in the knitting machine.

Figure 23:
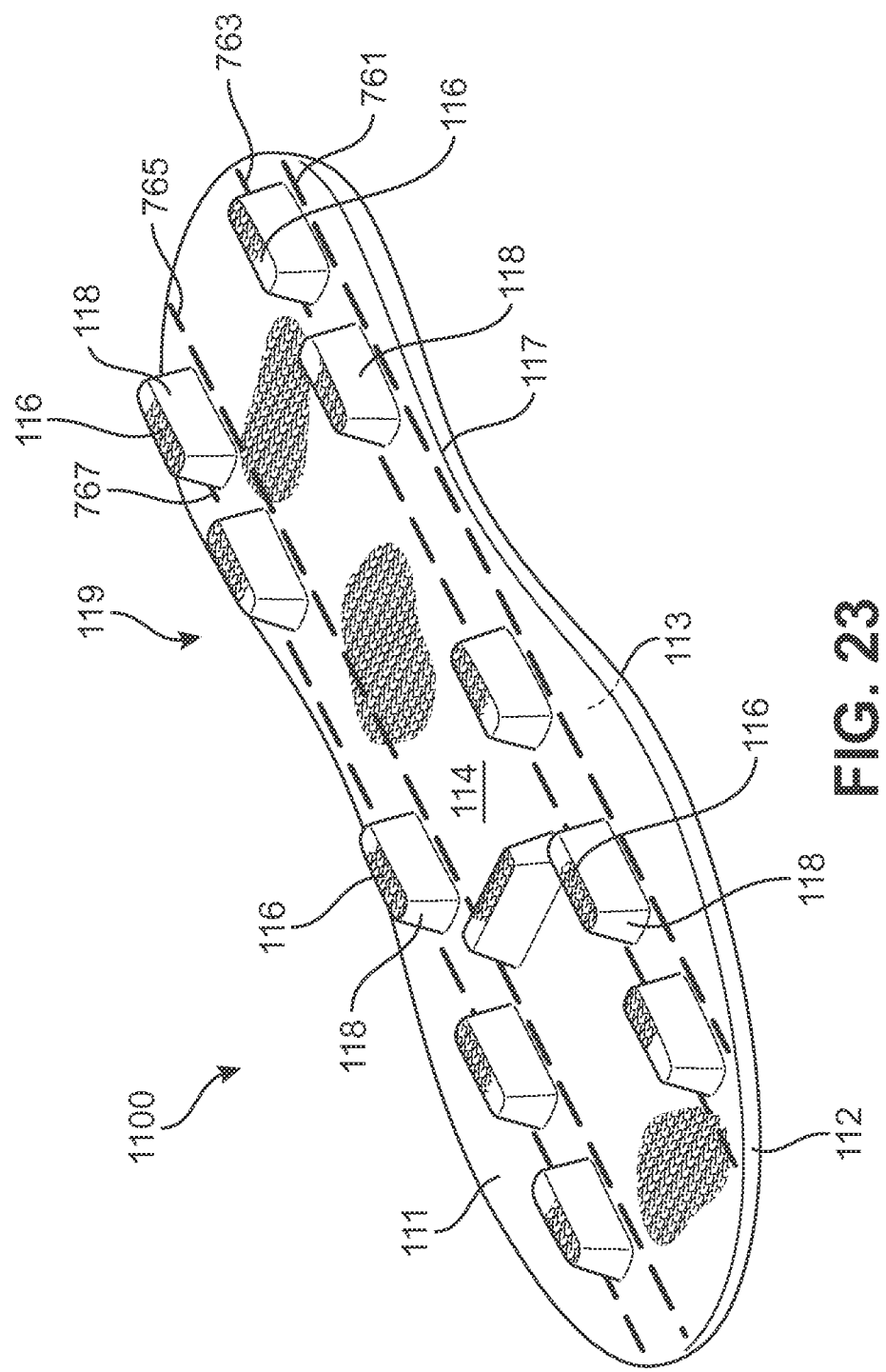
FIG. 23 is a perspective view of an outsole having cleat members.
Figure 24:
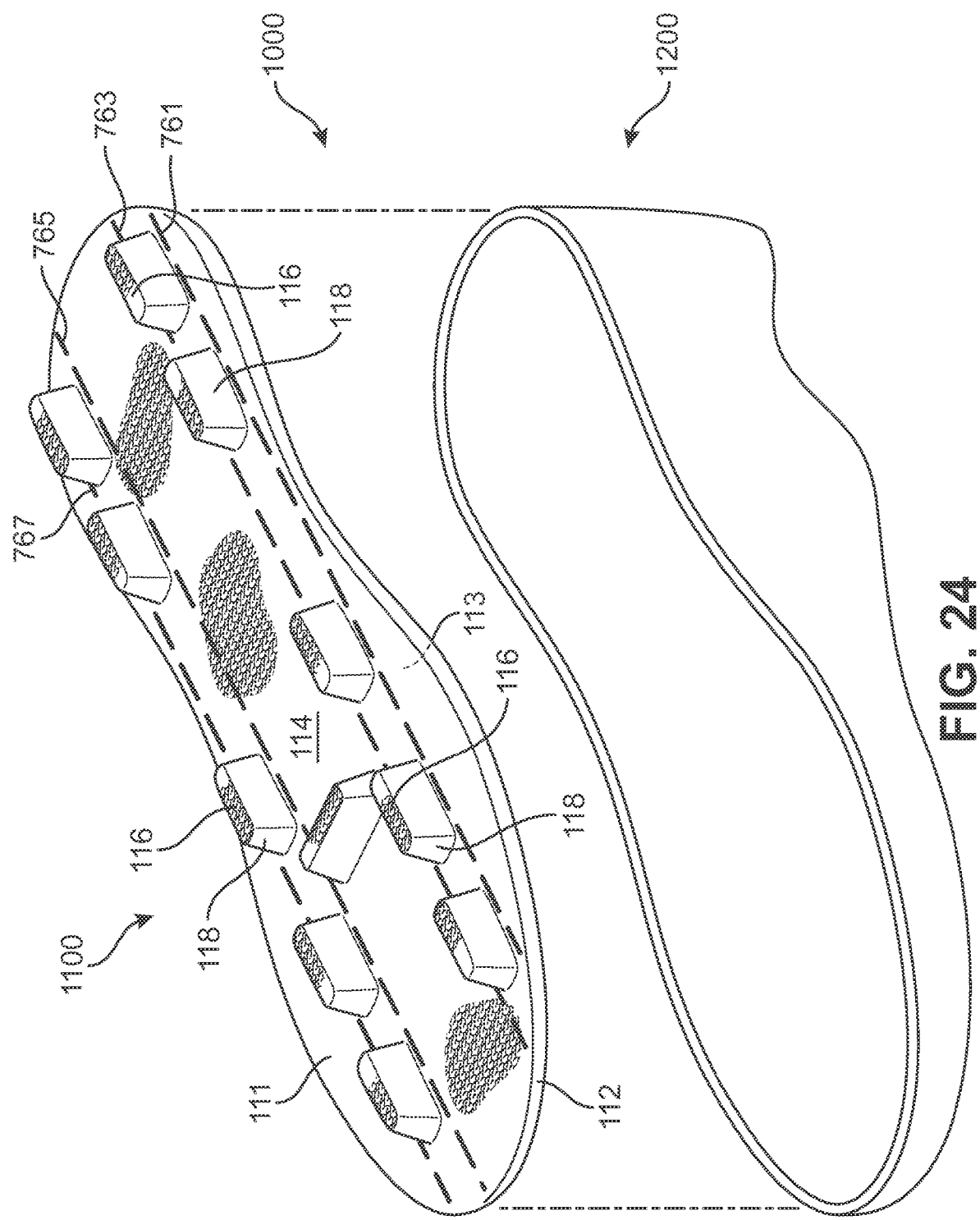
FIG. 24 illustrates a relationship between the outsole of FIG. 17 and an upper.
Figure 25:
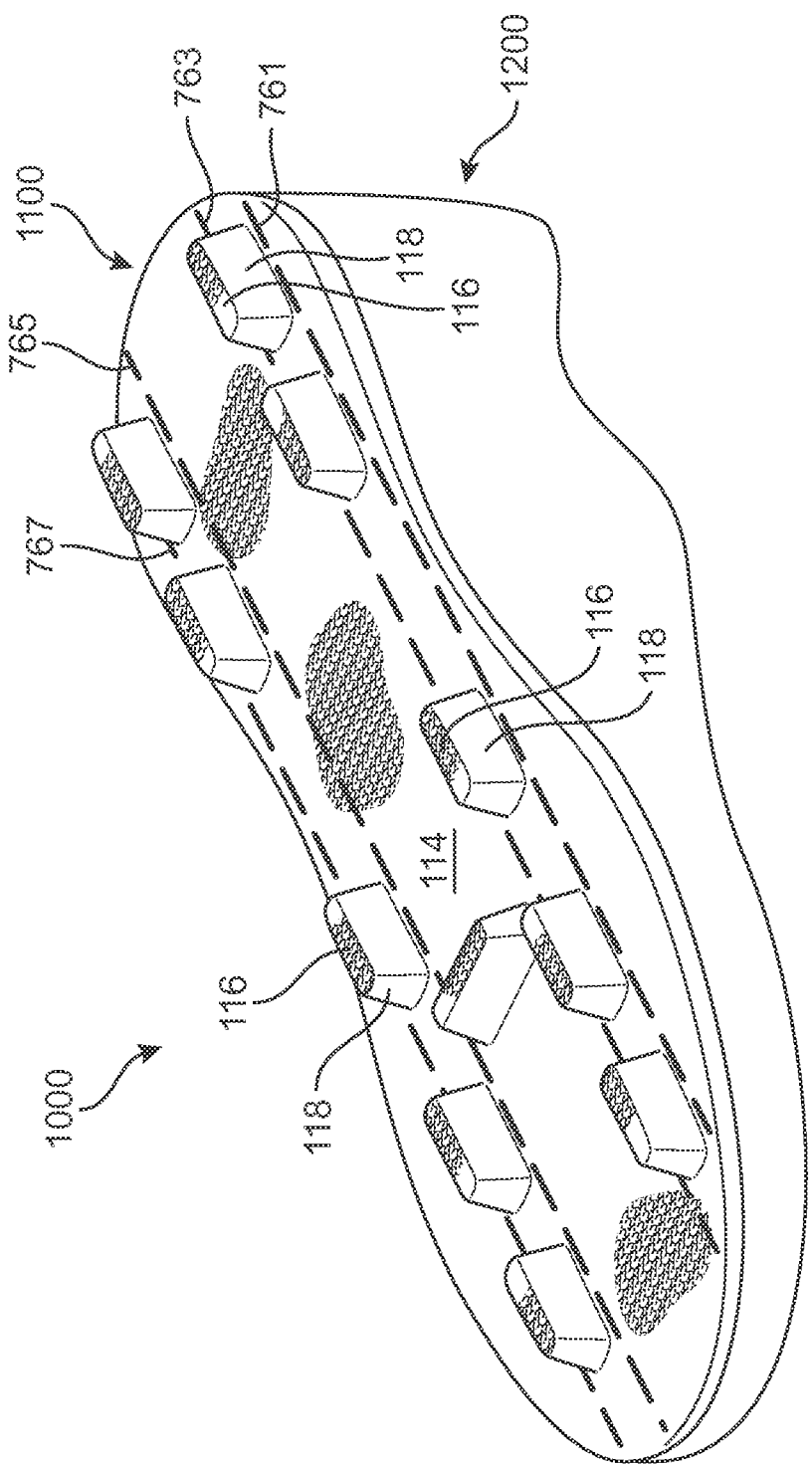
FIG. 25 illustrates an assembled article of footwear with the upper attached to the outsole.

FIG. 23 through FIG. 25 illustrate assembly of an article of footwear 1000. Article of footwear 100 incorporates both an upper and a sole system in a unitary knit construction, whereas article of footwear 1000 comprises an upper separate from the sole system. FIG. 23 illustrates sole system 1100, including knitted component 111 forming a one-piece knit outsole 112 having top surface 113 and ground-engaging cleat members 118. The bottom surface or side 114 of the outsole and the ground-engaging portion 116 of selected ground-engaging cleat members 118 also are indicated.

FIG. 24 illustrates assembly of article of footwear 1000 using sole system 1100. Upper 1200 is brought into contact with sole system 1100 and affixed to the top surface 113 thereof. Upper 1200 may be made from any material, such as leather, plastic, woven materials, and the like. FIG. 25 illustrates an assembled article of footwear 1000. This article of footwear 1000 includes a one-piece knit outsole 114.

Still other embodiments provide a method of making a sole system for an article of footwear. In accordance with the method, a one-piece knitted component is knitted to include a knit outsole. A ground-engaging cleat member is formed in the ground-facing side of the knit outsole by knitting. A surface of the ground-engaging cleat member may include a knitted surface that contacts the ground.

Embodiments including a foot-enclosing sole system may comprise areas in which different yarns are used. Different types of yarns may impart different properties to different areas of the knitted component. By combining various types and combinations of stitches and yarns, each area of knitted component may have specific properties that enhance the comfort, durability, and performance of the article of footwear.

In such embodiments, tensile elements also may extend into portions of the knitted component forming the upper and may be inlaid within the knitted component portions forming the upper. Such embodiments are illustrated in FIG. 5, FIG. 6, and FIG. 7, for example. Although the tensile elements illustrated in these figures run longitudinally, it may be possible to inlay a tensile element laterally within the knitted component. In such embodiments, the tensile element may be routed through the insole to pass from one side of the outsole to another. This arrangement would allow a single tensile element to be inlaid from one side (lateral or medial, for example) of the upper through the outsole. In some embodiments, the tensile element may be inlaid around the cleat members and extended, whether by inlay or onlay, to the upper. Such an arrangement would aid in alignment of parts and secure attachment of parts for form an article of footwear.

Embodiments of a sole system typically may include areas of durable yarns and fusible yarns. Durable yarns and fusible yarns typically may provide the wear resistance users likely will prefer to have in ground-engaging areas and areas of the sole system that are likely to experience greater wear. For example, the outer surface of the sole system comprises a knitted textile, but is likely to experience greater wear because the surface faces the ground and is, at least in part, adjacent ground-engaging protuberances that certainly may be ground-engaging. Further, fusible yarns may provide not only excellent wear resistance, but also support for the bottom of the foot. Strands of fusible yarn may, when heated, fuse to form an impermeable mass. Fusible yarns also may provide a highly water resistant surface that helps keep the interior of the article of footwear free of water that otherwise would enter the article of footwear from the outside.

Suitable materials also may be added anywhere on the outer surface where water resistance or another property or characteristic, such as rigidity, is sought. Such materials, typically in the form of a film, may be applied to the surface of the knitted component before the sole system is formed. Application of a film to a knitted component also may be accomplished after formation of components of the sole system.

For example, resistance of an article of footwear to incursion of water, particularly through the sole system, may be increased by affixing a thin film or water-resistant material on the outside surface of the outsole. The entirety of the outer sole surface may be covered with thin film, or only a portion or portions of the lower surface may be covered with film for wear resistance and water repellence.

Suitable thin film materials include polymers such as polyethylene and polypropylene, which may retain flexibility when bonded to the outer surface of a knitted component. Such films may suitably be used on surfaces of a knitted component that preferably retain their flexibility, such as an upper of an article of footwear. The skilled practitioner will be able to identify appropriate films.

In other embodiments, a thin film may be rigid or resistant to bending before or upon application, typically with heat and pressing. Application with heat and pressing causes the film to adhere or being adhered to the knitted component. Such rigid film may be formed of plural thin layers or one or two thicker layers. Plural materials may be stacked to form a more rigid film. A thicker, single layer also may be used.

Embodiments of a foot-enclosing sole system may include areas of softer yarns, compliant yarns, durable yarns, and fusible yarns, for example. Softer and compliant yarns typically may be used where comfort is an important feature, with durable yarns used in areas susceptible to wear. In particular, embodiments may have fusible yarns on the outsole, the protruding ground-engaging projection, and on the ground-engaging surface. Fusible yarns may be particularly durable and may serve the same purposes ascribed to them above. Similarly, a thin film may be used to the same advantage as set forth above.

Another suitable yarn may be a core and sheath-type bi-component construction. Core and sheath construction is obtained having a sheath of material having one set of properties essentially concentric with and surrounding a core of yarn material having another set of properties and characteristics. In embodiments, the sheath material is one type of yarn having a first set of properties and characteristics. Other bi-component yarns, such as "islands in the sea" type, also may be suitable. Such yarns typically may have fusible material on the outside, just as a core and sheath fiber has fusible material as a sheath material. Still another technique may be to spray a solvent-based fusible composition onto yarn. In such embodiments, the solvent may be water, thus making the composition environmentally sensitive.

In still further embodiments, a plurality of yarns may be used to provide transition zones for areas of the knitted component. For example, whereas durable, rigid yarns may be preferred for surfaces of the knitted component that are ground-facing, such yarns may not be preferred for an upper of an article of footwear. Rather, softer, more compliant yarns may be preferred on the upper, but such yarns may wear out prematurely in areas of high abrasion or stress, such as in the area of the heel, for example. For such high abrasion areas, if may be preferable to have a durable yarn.

In some embodiments, a rigid layer may be applied to both the top side of the outsole and the ground-facing side of the outsole. Such embodiments provide a rigid outsole, yet retain the look, properties, and characteristics of a knitted textile formed from a knitted component. Further, the rigid layer of material attached to the top side of the outsole may be useful in forming a protruding ground-engaging member.

Other embodiments may include a rubberized portion on the ground-facing surface of the outsole. A rubberized portion may be formed on the surface of the outsole by painting on a rubberized material, by adhering a rubberized material to the portion of the knitted component that forms the ground-facing surface of the outsole, or in any suitable method.

In embodiments having a layer of material on the ground-facing surface of the outsole, the shape of the layer may be formed to reduce adhesion of mud and dirt to the bottom of the sole, and thus to the bottom of an article of footwear incorporating the sole system. Various geometric shapes may be formed in the covering layer, or added to the ground-facing surface of the outsole, to minimize adhesion of mud and dirt.

While various embodiments of the invention have been described, the description is intended to be exemplary rather than limiting, and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims. As used in the claims, "any of", when identifying the previous claims, is intended to mean (i) any one claim or (ii) any combination of two or more claims identified.

What is claimed is:

1. A sole system for an article of footwear, the sole system including:
    a knitted component incorporating a knit outsole with a plurality of knitted courses that extend in a coursewise direction,
    wherein the knit outsole has a bottom side, and a top side opposite the bottom side;
    a ground-engaging cleat member protruding from the bottom side of the knit outsole; and
    a tensile element having an inlaid strand that is inlaid in the coursewise direction within at least one course of the knit outsole such that the inlaid strand extends in a longitudinal direction,
    wherein the longitudinal direction extends from a heel region to a toe region of the sole system.

2. The sole system of claim 1, wherein the inlaid strand of the tensile element extends from the heel region to the toe region of the sole system.

3. The sole system of claim 1, wherein the inlaid strand of the tensile element extends between at least two of the ground-engaging cleat members.

4. The sole system of claim 1, wherein the tensile element is at least partially exposed on the bottom side of the knit outsole.

5. An article of footwear including a sole system, the article of footwear includes an upper and the sole system connected thereto;
    the upper having a bottom;
    the sole system including:
    a knitted component incorporating a knit outsole, wherein the knit outsole has a bottom side with a bottom surface, and a top side; and
    a plurality of ground-engaging cleat members protruding from the bottom side of the knit outsole; and
    at least one tensile element having at least one strand that is inlaid in a coursewise direction within a knitted course of the knitted component such that it extends along the length of the knitted course, and such that it extends between at least two adjacent loops of the knitted course,
    wherein the top side of the knit outsole and the bottom of the upper are affixed.

6. The sole system of claim 5, wherein the strand of the tensile element extends from a heel region to a toe region of the sole system.

7. The sole system of claim 5, wherein the strand of the tensile element extends between at least two of the ground-engaging cleat members.

8. The sole system of claim 5, wherein the tensile element is at least partially exposed on the bottom side of the knit outsole.

9. A sole system for an article of footwear, the sole system comprising:
    a knit outsole having an inlaid tensile element with a first portion inlaid within a first course and a second portion inlaid within a different second course; and
    the knit outsole having a bottom side, and a top side, wherein the bottom side of the outsole includes a cleat member that is located between the first portion and the second portion of the inlaid tensile element.

10. The sole system of claim 9, wherein the inlaid tensile element is inlaid longitudinally within the knit outsole and extends in a coursewise direction.

11. The sole system of claim 9, wherein the tensile element extends between at least two of the ground-engaging cleat members.

12. The sole system of claim 9, wherein the tensile element is at least partially exposed on the bottom side of the knit outsole.

13. The sole system of claim 9, wherein the first portion and the second portion of the inlaid tensile element are formed from a continuous strand.

14. The sole system of claim 1, wherein the ground-engaging cleat member is reinforced.

15. The sole system of claim 5, wherein the knit outsole comprises fusible yarn.

16. The sole system of claim 15, wherein the knitted component further comprises a second yarn being different than the fusible yarn.

17. The sole system of claim 5, wherein at least one ground-engaging cleat member is reinforced.

18. The sole system of claim 9, wherein the knit outsole comprises fusible yarn.

19. The sole system of claim 9, wherein at least one ground-engaging cleat member is reinforced.

* * * * *